United States Patent
Hagiwara

(10) Patent No.: US 6,839,216 B2
(45) Date of Patent: Jan. 4, 2005

(54) SOLENOID DRIVING DEVICE

(75) Inventor: Masao Hagiwara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 171 days.

(21) Appl. No.: 09/934,572

(22) Filed: Aug. 23, 2001

(65) Prior Publication Data

US 2002/0024793 A1 Feb. 28, 2002

(30) Foreign Application Priority Data

Aug. 31, 2000 (JP) ........................................ 2000-263091

(51) Int. Cl.$^7$ ............................................. H01H 47/00
(52) U.S. Cl. ..................................... 361/152; 361/93.1
(58) Field of Search .............................. 361/187, 93.1, 361/93.9, 139, 142, 152, 153, 154, 160, 166, 168.1, 170, 189, 190, 191

(56) References Cited

U.S. PATENT DOCUMENTS 4,485,424 A * 11/1984 Niwa et al. .................. 361/152
5,801,504 A * 9/1998 Endo et al. .................. 318/434
5,941,282 A * 8/1999 Suzuki et al. ................ 137/884
6,157,160 A * 12/2000 Okawa et al. .............. 318/701

* cited by examiner

Primary Examiner—Ronaki Leja
(74) Attorney, Agent, or Firm—Varndell & Varndell, PLLC

(57) ABSTRACT

To reduce the number of signal lines for connecting an current detector and a solenoid electrically.

Between solenoids 1–1 and 1–2 and switches SW-1 and SW-2 and on the high sides with respect to the individual solenoids, respectively, there are connected current detectors 4-1 and 4-2. The end portions of the solenoids 1–1 and 1–2 on the individual GND sides are made common. The number of signal lines for connecting a controller and the two solenoids may be "2+1=3". Therefore, the number of terminals (or the pin number) of a connector 3 may also be "2+1=3" (P1 to P3). The current detectors 4-1 and 4-2 detect the electric currents to flow to the solenoids 1–1 and 1–2. In the case of an incomplete grounding, for example, it is possible to detect an overcurrent to flow to the solenoids.

13 Claims, 29 Drawing Sheets ically driven vehicle such as a construction machine is provided therein with a solenoid driving device including: a solenoid for driving an electromagnetic valve (or an electromagnetic proportion control valve); and a controller for controlling an electric current to the solenoid.

SOLENOID DRIVING DEVICE

BACKGROUND OF THE INVENTION

1. Field of the Invention

The present invention relates to a solenoid driving device for controlling an electric current to be fed to a solenoid.

2. Related Art

In the prior art, a hydraulically driven vehicle such as a construction machine is provided therein with a solenoid driving device including: a solenoid for driving an electromagnetic valve (or an electromagnetic proportion control valve); and a controller for controlling an electric current to the solenoid.

The device of this kind is known, as shown in FIG. 25 or FIG. 26.

In FIG. 25, the left-hand side of a dotted line shows the (inside) of a controller side, and the right-hand side shows a solenoid (or an electromagnetic valve) side.

In this device shown in FIG. 25, a solenoid 1 is connected at its two end portions 1A and 1B, respectively, through signal lines (or wire harnesses) 2A and 2B with terminal portions 3A and 3B of a connector 3, as disposed on the controller side. Generally, the electromagnetic valve or solenoid 1 is arranged at a position spaced from the controller, and these components are connected by the signal lines 2A and 2B of about 1 to 2 m.

On the controller side, on the other hand, the anode (+) side of a DC load power source VB is connected with the terminal portion 3A of the connector 3 through a switch SW for pulse modulations, and a current detector 4 is connected between the terminal portion 3B of the connector 3 and the GND (or ground). In short, the current detector 4 is disposed on the low side (or the GND side) with respect to the solenoid 1.

Between the terminal portion 3A of the connector 3 and the GND, there is connected a free-wheel diode D which is connected at its cathode with the terminal portion 3A and at its anode with the GND.

The switch SW is constructed to include a switching element such as a transistor or a field effect transistor and is turned ON/OFF (or switched) according to a pulse-width modulation signal (or a PWM signal).

When this switch SW is ON, the electric current from the anode side of the load power source VB flows to the solenoid 1 through the switch SW, the terminal portion 3A of the connector 3 and the signal line 2A and further to the GND through the signal line 2B, the terminal portion 3B of the connector 3 and the current detector 4. At this time, the current detector 4 detects the electric current having from the solenoid 1 and outputs the detected result. This detected result is used as the signal for controlling the electric current to flow to the solenoid 1, that is, the signal for determining the duty ratio of the pulse-width modulation signal to turn ON/OFF the switch SW.

As a result, the electromagnetic valve (or the electromagnetic proportion control valve) in response to the action of the solenoid 1.

On the other hand, the device shown in FIG. 26 is modified in the arrangement of the current detector 4 and the switch SW from the construction of the device shown in FIG. 25. Here in FIG. 26, the portions for performing the same functions as those of the components shown in FIG. 25 are designated by the common reference numerals.

Now in FIG. 26, the current detector 4 is arranged on the high side (or on the power source side) with respect to the solenoid 1, and the switch SW is connected with the GND.

Specifically, the current detector 4 is connected between the load power source VB and the terminal portion 3A of the connector 3, and the switch SW is connected between the terminal portion 3B of the connector 3 and the GND. Between the input side of the current detector 4 and the terminal portion 3B of the connector 3, on the other hand, there is connected the free-wheel diode D which is connected at its cathode with that input side and at its anode with that terminal portion 3B.

In this case, when the switch SW is ON, the electric current from the anode side of the load power source VB flows to the solenoid 1 through the current detector 4, the terminal portion 3A of the connector 3 and the signal line 2A and further to the GND through the signal line 2B, the terminal portion 3B of the connector 3 and the switch SW. At this time, the current detector 4 detects the electric current to flow through the solenoid 1 and outputs the detected result. This detected result is used like before as the signal for determining the duty ratio of the pulse-width modulation signal to turn ON/OFF the switch SW.

Here in the devices shown in FIGS. 25 and 26, the controller controls only one solenoid. As a matter of fact, however, the controller controls a plurality of solenoids, as shown in FIGS. 27 and 28. In these solenoid driving devices shown in FIGS. 27 and 28, the controller is given a construction similar to that of the controller (or the controller inner side) of the device shown in FIG. 25 or 26 for one solenoid. Here in FIGS. 27 and 28, there are omitted the reference numerals for designating the signal lines and the end portions of the solenoid.

SUMMARY OF THE INVENTION

In the solenoid driving devices of the prior art shown in FIGS. 27 and 28, however, the switch SW and the current detector 4 are disposed inside of the controller, as described above, and the solenoid 1 for driving the electromagnetic valve of the vehicle is disposed outside of the controller. In this case, there are required signal lines (or wire harnesses) of the number of "the number of solenoids×2". Where two solenoids are provided, as shown in FIGS. 27 and 28, for example, there are required signal lines of 2×2=4. Where five solenoids are provided, there are required signal lines of 5×2=10. Thus, there is a problem that the number of signal lines is drastically increased with the increase in the solenoid number.

Therefore, a first object of the present invention is to reduce the number of signal lines for connecting an current detector and a solenoid electrically.

In the solenoid driving device shown in FIG. 25 or 27, on the other hand, the current detector is disposed on the low side (or on the GND side) with respect to the solenoid 1 so that the incomplete ground or the complete grounding of the solenoid 1 cannot be detected.

Specifically, the signal line of about 1 to 2 m for connecting the solenoid 1 arranged outside of the controller and the controller (or its connector 3) is exposed at its conductive portion, when led around in the car body connected with the GND, to contact with the car body. Then, the solenoid 1 may be incompletely or completely grounded.

Where the solenoid 1 is incompletely or completely grounded (as referred to the dotted line portion), as shown in FIG. 29, the summed electric current (i1+i2) of an electric current i1 to flow to the GND through the switch SW, the solenoid 1 and the current detector 4 and an electric current i2 to flow through the switch SW and the solenoid 1 to the GND (or the car body grounded to the GND) flows from the load power source VB to the switch SW.

In short, the summed electric current (i1+i2) of the electric current i1 and the electric current i2 flows through the switch SW and the solenoid 1. However, the current detector 4, as disposed on the low side with reference to the solenoid 1, can detect the electric current i1 but not the electric current i2.

In the solenoid driving device of the prior art having the current detector 4 on the low side with respect to the solenoid 1, therefore, the switch SW and the solenoid 1 in the controller may be troubled by the flow of an overcurrent.

In order to prevent this overcurrent, on the other hand, the device shown in FIG. 29 has to be provided with an overcurrent detector separately between the switch SW and the connector 3 (or its terminal portion 3A). This means that the size of the printed substrate for arranging the switch SW, the current detector 4, the connector 3 and the overcurrent detector has to be large-sized to enlarge the controller itself.

Therefore, a second object of the invention is to make it possible to detect the incomplete grounding or the complete grounding and unnecessary to provide the overcurrent detector separately.

In the solenoid driving device having the construction in which the current detector is disposed on the low side (or on the GND side) shown in FIG. 27, moreover, there arise problems that the incomplete grounding or the complete grounding cannot be detected, as described above and that it is necessary to provide the overcurrent detector separately. Other problems are that the signal lines (or wire harnesses) of the number of "the number of solenoids×2" are required for connecting the solenoids and the controller, and that the signal number increases with the increase in the solenoid number thereby to increase the terminal number (or the pin number) of connectors.

This means that it is necessary to enlarge the size of the printed substrate for arranging the switch SW, the current detector 4, the connector 3 of a size corresponding to the terminal number, and the overcurrent detector, and that the controller itself is large-sized.

Therefore, a third object of the invention is to reduce the terminal number of the connector, to detect the incomplete grounding and the complete grounding and to make it unnecessary to provide the overcurrent detector separately.

In order to achieve the first object, according to a first aspect of the invention, there is provided a solenoid driving device comprising: a solenoid; and switch means for feeding an electric current from a power source intermittently to said solenoid, and the solenoid driving device further comprises a current detector connected between said solenoid and said switch means for detecting the electric current to flow through said solenoid.

In order to achieve the second object, on the other hand, according to a second aspect of the invention in the first aspect, said current detector is disposed on the side of said power source with respect to said solenoid.

In order to achieve the second object, moreover, according to a third aspect of the invention in the first or second aspect, said switch means and said current detector are disposed in a controller, the outside of which said solenoid is connected with through a terminal portion, and said current detector detects the electric current to flow through said solenoid connected to the outside of said controller through the terminal portion.

The first to third aspects of the invention will be described with reference to FIGS. 1 to 3.

The current detector 4 is connected, as shown in FIG. 1, between the solenoid 1 and the switch SW and on the high side (or on the side of the load power source) with respect to the solenoid 1.

The switch SW and the current detector 4 are disposed inside of the (not-shown) controller shown on the left-hand side of the dotted line in FIG. 1. The solenoid 1, as shown on the right-hand side of the dotted line in FIG. 1, is connected with the outside of the controller through the connector 3. In short, the solenoid 1 is connected through the signal lines 2A and 2B with the terminal portions 3A and 3B of the connector 3.

The principle for driving a plurality of solenoids in a solenoid driving device 10 is shown in FIG. 3. The explanation is made on the case of two solenoids.

In FIG. 3, switches SW-1 and SW-2, current detectors 4-1 and 4-2, solenoids 1-1 and 1-2, and free-wheel diodes D-1 and D-2 have functions similar to those of the switch SW, the current detector 4, the solenoid 1 and the free-wheel diode D, as shown in FIG. 1, respectively.

In FIG. 3, on the other hand, the terminal portion P1 of the connector 3 corresponds to the terminal portion 3B of the connector 3 shown in FIG. 1, and the terminal portions P2 and P3 of the connector 3 correspond to the terminal portion 3A of the connector 3 shown in FIG. 1. In other words, the one-end portions of the solenoids 1-1 and 1-2 to be connected with the GND are made common. It is, therefore, sufficient that the number (or the pin number) of the terminal portions of the connector 3 is a value determined as "the solenoid number+1".

Here, while the solenoid driving device 10 is running, the solenoid 1 is assumed to have been incompletely or completely grounded as a result that the conductor portion of a signal line for connecting the solenoid 1 and the current detector 4 (or the connector 3) is exposed to contact with the car body connected to the GND. Here, the description is made on the case of one solenoid for conveniences.

In this case, the electric current to be fed from the load power source VB is the sum of an electric current i1 to flow through the switch SW, the current detector 4, the terminal portion 3A of the connector 3, the signal line 2A, the solenoid 1, the signal line 2B and the terminal portion 3B of the connector 3 to the GND, and an electric current i2 to flow through the switch SW, the current detector 4, the terminal portion 3A of the connector 3, the signal line 2A and the solenoid 1 to the GND (or the car body connected with the GND).

In short, the electric current of "the electric current i1+the electric current i2" flows from the load power source VB through the switch SW to the current detector 4. Therefore, the electric current (or the overcurrent) of "the electric current i1+the electric current i2" can be detected by the current detector 4. Moreover, a control for preventing the overcurrent can be made on the basis of the detected result.

According to the first aspect of the invention, as has been described hereinbefore, the current detector is connected between the solenoid and the switch means. Where the drive of a plurality of solenoids is to be controlled, the one end portions of the individual solenoids on the load power source side or the GND side can be made common so that the number of signal lines for connecting the plurality of current detectors and the plurality of solenoids electrically can be reduced. As a result, it is possible to reduce the imperfect contact for connecting the signal lines according to the reduction in the number of signal lines.

According to the second aspect of the invention, on the other hand, it is possible to expect the effects of the first aspect. In addition, the current detector is connected between the solenoid and the switch means and on the power source side (or on the high side) with respect to the solenoid. It is, therefore, possible to detect the incomplete grounding or the complete grounding thereby to detect the overcurrent accompanying that grounding. Without providing the overcurrent detector separately, moreover, the overcurrent can be detected by the current detector.

According to the third aspect of the invention, moreover, it is possible to expect the effects of the foregoing first or second aspect. In addition, the solenoid is connected with the outside of the controller through the terminal portions. As a result, the terminal number of the connector can be reduced to reduce the imperfect contact accordingly at the connecting portion of the connector.

On the other hand, the size (or the area of the printed wiring region) of a printed substrate, in which the connector having its terminal number reduced drastically as compared with the prior art is arranged, can be reduced to make the solenoid driving device itself compact.

DESCRIPTION OF THE PREFERRED EMBODIMENTS

The present invention will be described in connection with its embodiments with reference to the accompanying drawings.

Figure 1:
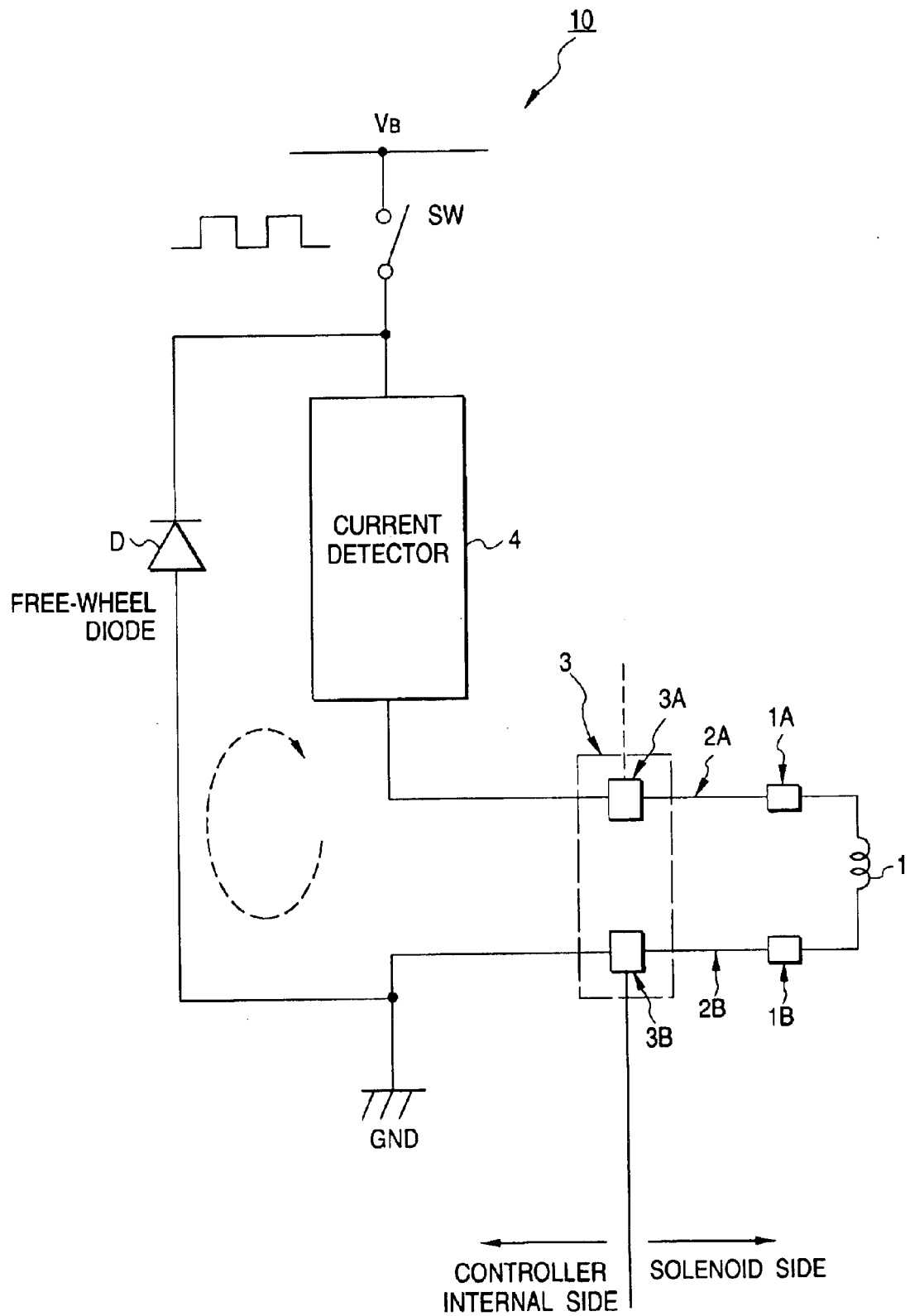
FIG. 1 is a principle diagram for explaining the principle of a solenoid driving device according to the invention.
Figure 2:
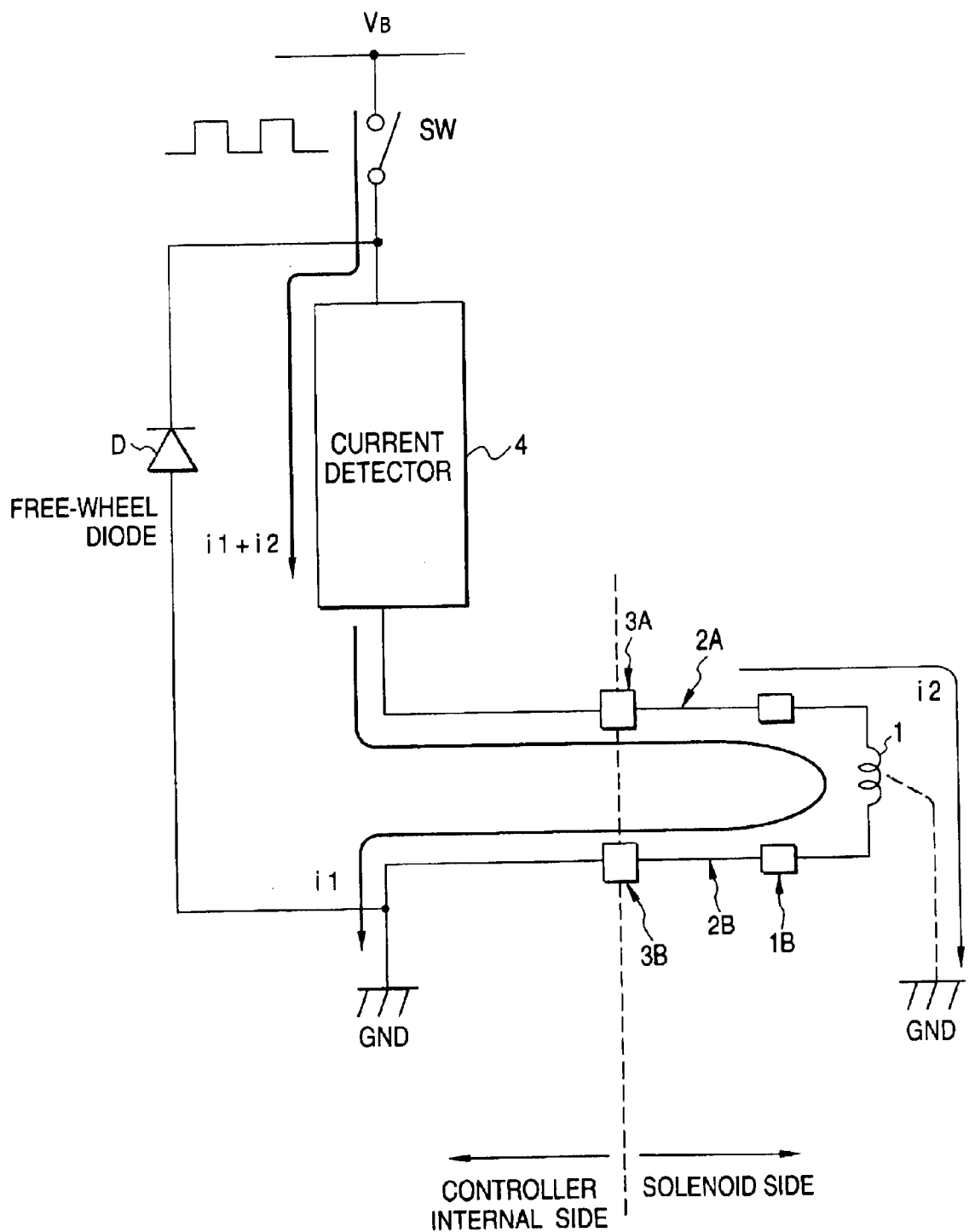
FIG. 2 is a principle diagram for explaining the principle of a solenoid driving device according to the invention.

FIG. 1 shows a principle diagram of a solenoid driving device 10 according to the invention.

Figure 26:
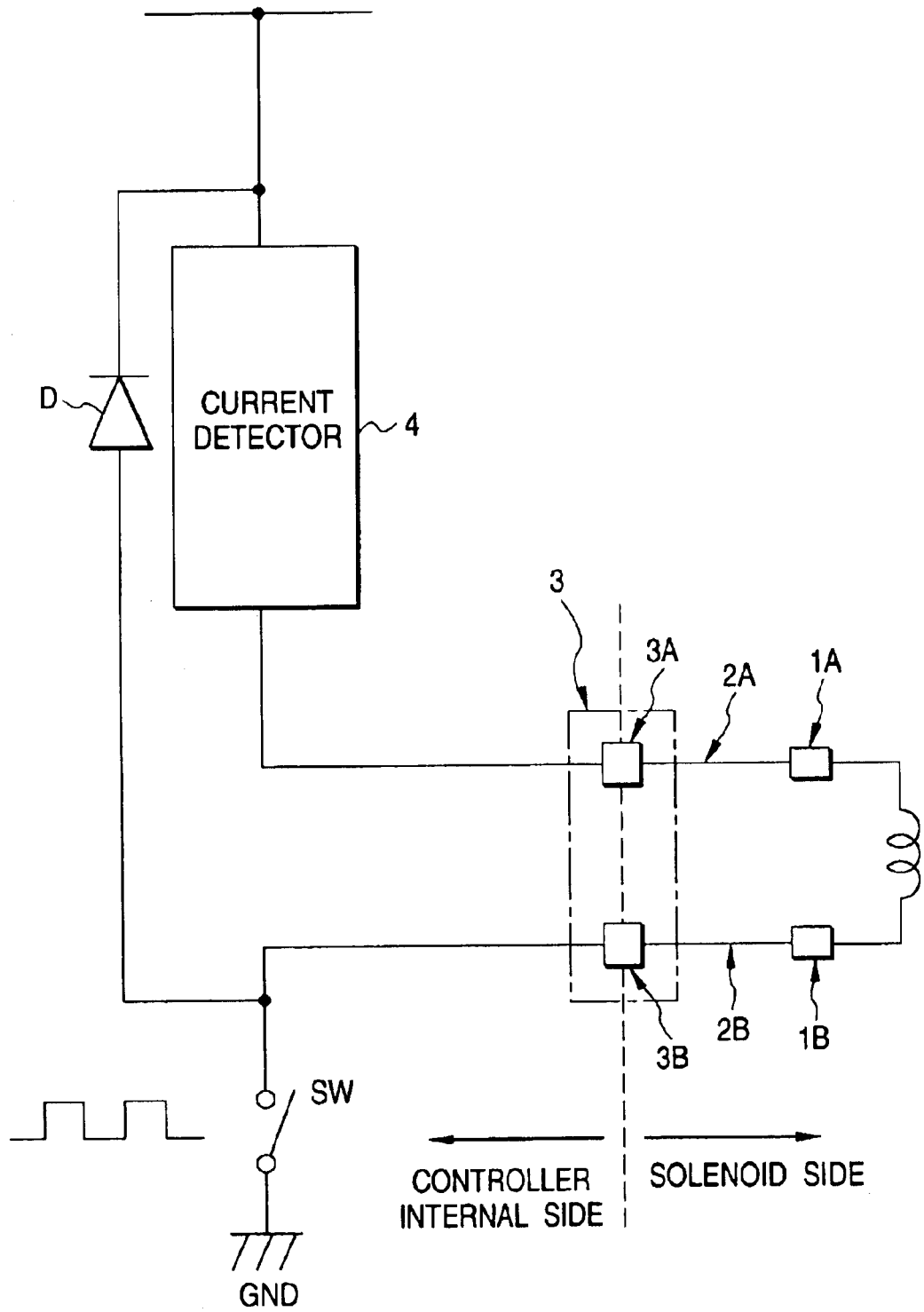
FIG. 26 is a construction diagram showing the construction of a solenoid driving device of the prior art.
Figure 27:
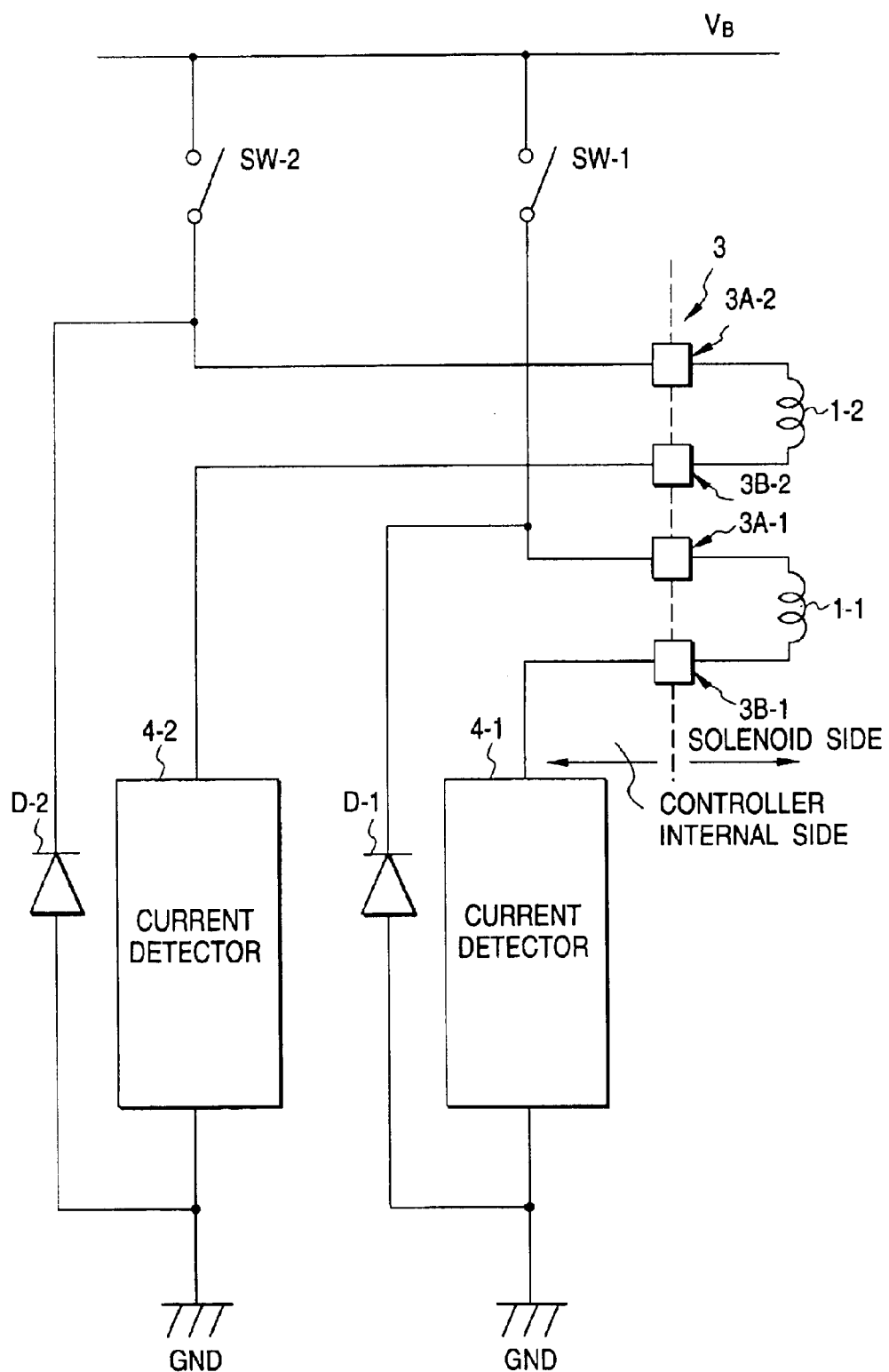
FIG. 27 is a construction diagram showing the construction of a solenoid driving device of the prior art.
Figure 28:
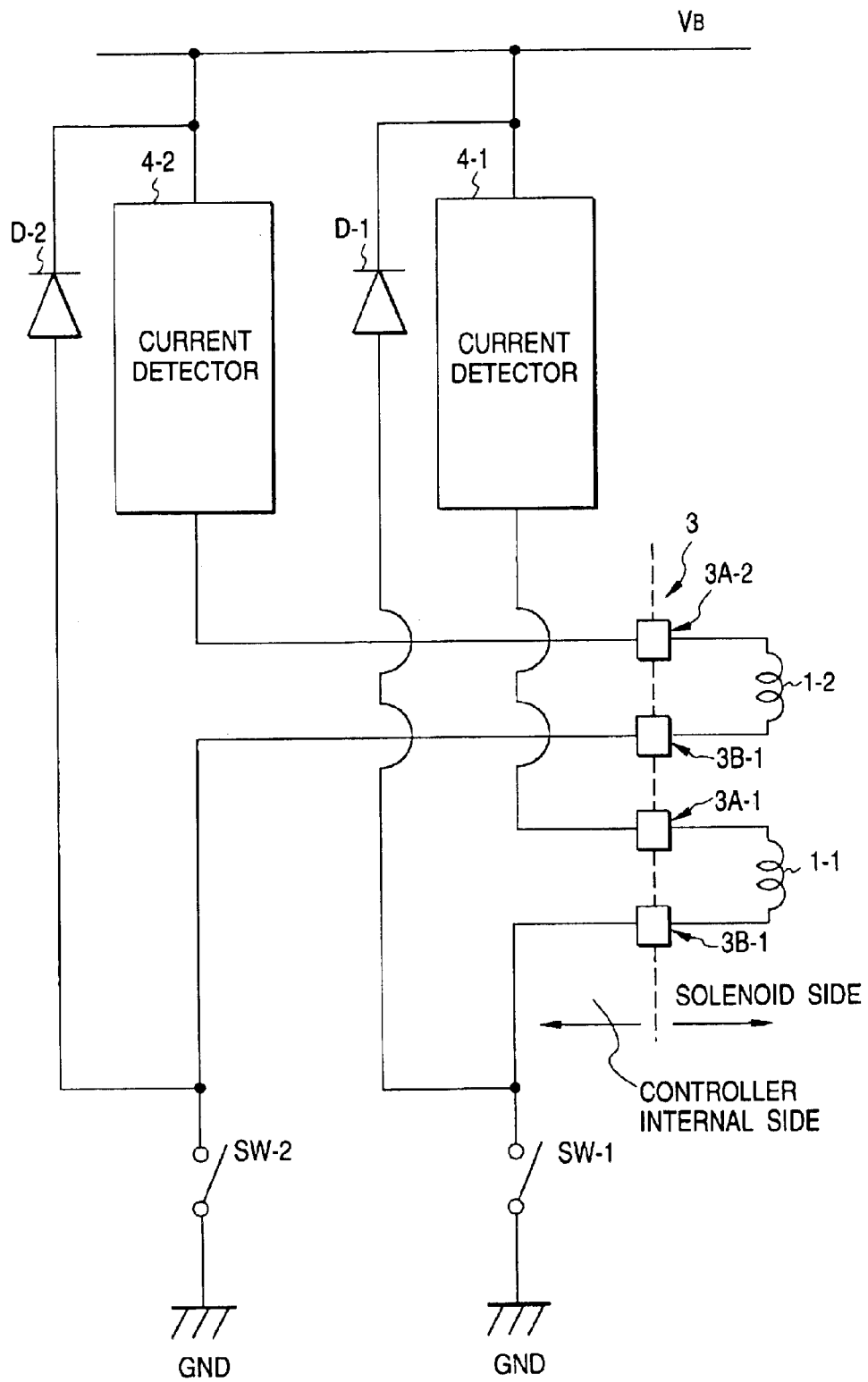
FIG. 28 is a construction diagram showing the construction of a solenoid driving device of the prior art.

The solenoid driving device 10 is modified in the arrangement of a switch SW from the construction of the solenoid driving device of the prior art shown in FIG. 26. Here in FIG. 1, the portions for performing the same functions as those of the components shown in FIG. 26 are designated by the common reference numerals.

In this embodiment, a solenoid 1 is assumed to be a proportional solenoid.

The switch SW is connected between the node between the cathode of a free-wheel diode D and a current detector 4 and the anode of a load power source VB. In other words, the current detector 4 is connected between the solenoid 1 and the switch SW and is located on the high side (or on the load power source side) with respect to the solenoid 1.

On the other hand, the anode of the free-wheel diode D and the terminal portion 3B of a connector 3 are connected with the ground (GND). In other words, the terminal portion 1B (or the low side) of the solenoid 1 is connected at all times with the GND.

In the solenoid driving device 10 thus constructed, when the switch SW to be turned ON/OFF (or switched) according to a predetermined duty ratio of a pulse-width modulation signal (or a PWM signal) is turned ON, an electric current is fed from the load power source VB to the solenoid 1. Specifically, the electric current flows through the switch SW, the current detector 4, the connector 3 and a signal line 2A to the solenoid 1 and further through a signal line 2B and the connector 3 to the GND.

When the switch SW is turned OFF from its ON state, on the other hand, the electric current is fed from the solenoid 1 to the free-wheel diode D and the current detector 4 (i.e., in a direction, as indicated by a broken arrow in FIG. 1) by the inverse electromotive force generated in the solenoid 1.

Specifically, the free-wheel diode D performs a function, when the switch SW is quickly turned OFF, to protect the switch SW or a switching element such as a transistor or a field effect transistor against the voltage (or the inverse electromotive force) which is generated for releasing the energy stored in the solenoid. At the same time, the free-wheel diode D also performs a function to continue a load current, i.e, an electric current to be fed to the solenoid 1, by feeding an electric current (i.e., a reflex current) in the direction indicated by the broken arrow in FIG. 1.

Here, while the solenoid driving device 10 is running, the solenoid 1 is assumed to have been incompletely or completely grounded as a result that the conductor portion of a signal line for connecting the solenoid 1 and the current detector 4 (or the connector 3) is exposed to contact with the car body connected to the GND.

In this case, the electric current to be fed from the load power source VB is the sum of an electric current i1 to flow through the switch SW, the current detector 4, the terminal portion 3A of the connector 3, the signal line 2A, the solenoid 1, the signal line 2B and the terminal portion 3B of the connector 3 to the GND, and an electric current i2 to flow through the switch SW, the current detector 4, the terminal portion 3A of the connector 3, the signal line 2A and the solenoid 1 to the GND (or the car body connected with the GND).

In short, the electric current of "the electric current i1+the electric current i2" flows from the load power source VB through the switch SW to the current detector 4. Therefore, the electric current (or the overcurrent) of "the electric current i1+the electric current i2" can be detected by the current detector 4 to make a control for preventing the overcurrent on the basis of the detected result.

Where the overcurrent is detected by the current detector 4, for example, the action of the switch SW is interrupted to inform the overcurrent (by a lamp indication or a display indication, for example). As a result, the switch SW and the solenoid 1 can be prevented from a trouble due to the overcurrent, and a quick maintenance can be made by informing the outside of the occurrence of the overcurrent (or the grounding).

Here will be described the principle for driving a plurality of solenoids in the solenoid driving device 10 according to the invention shown in FIG. 1. Here will be described the case of two solenoids.

Figure 3:
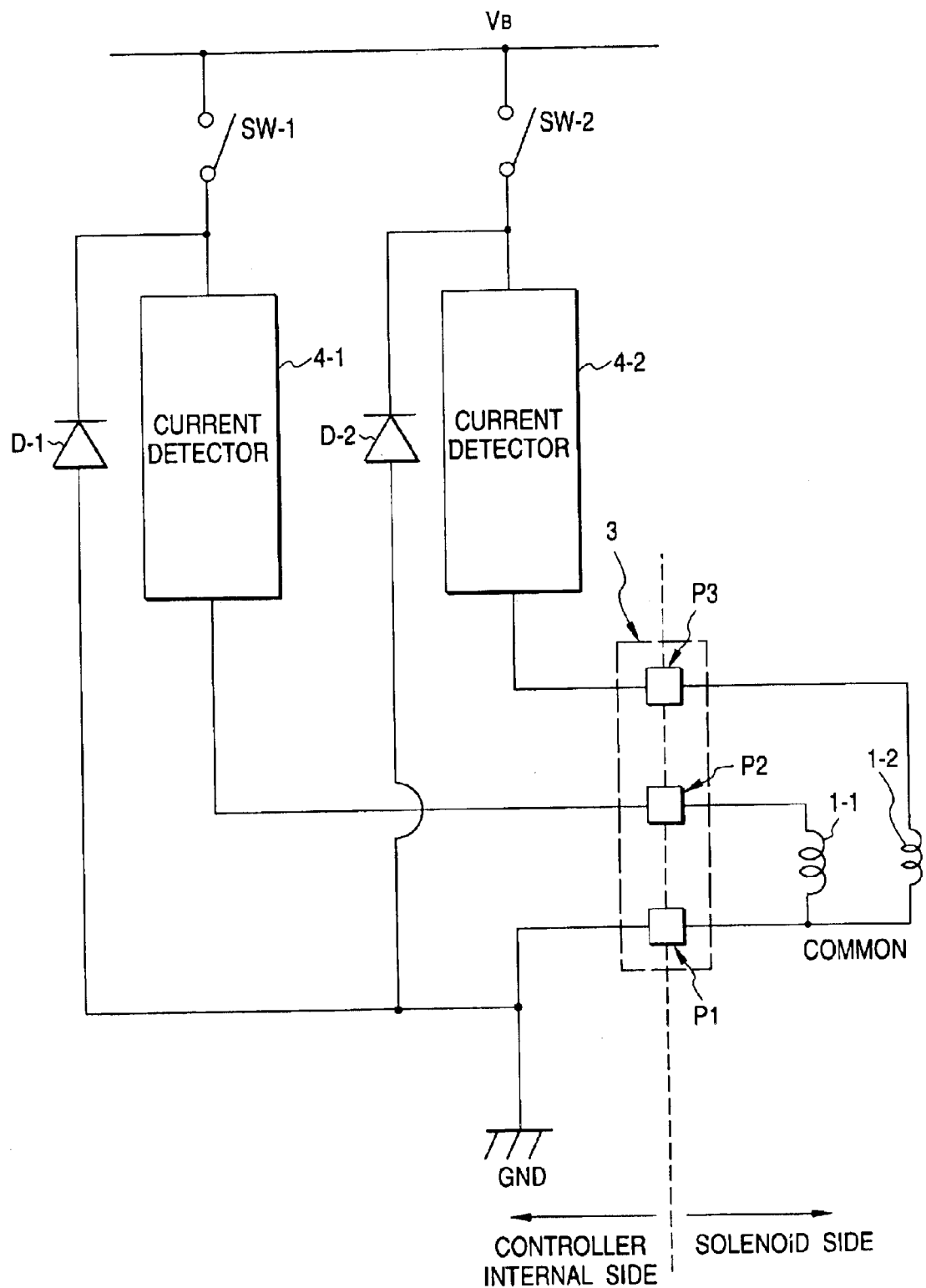
FIG. 3 is a principle diagram for explaining the principle of a solenoid driving device according to the invention.

FIG. 3 is a principle diagram showing the principle of the solenoid driving device 10 for driving the two solenoids.

In FIG. 3, switches SW-1 and SW-2, current detectors 4-1 and 4-2, solenoids 1-1 and 1-2, and free-wheel diodes D-1 and D-2 have functions similar to those of the switch SW, the current detector 4, the solenoid 1 and the free-wheel diode D, as shown in FIG. 1, respectively.

In FIG. 3, on the other hand, the terminal portion P1 of the connector 3 corresponds to the terminal portion 3B of the connector 3 shown in FIG. 1, and the terminal portions P2 and P3 of the connector 3 correspond to the terminal portion 3A of the connector 3 shown in FIG. 1. In other words, the one-end portions of the solenoids 1-1 and 1-2 to be connected with the GND are made common. It is, therefore, sufficient that the number (or the pin number) of the terminal portions of the connector 3 is a value determined as "the solenoid number+1".

From FIG. 3, there are omitted the signs of the terminal portions of the signal lines and the solenoids.

Figure 4:
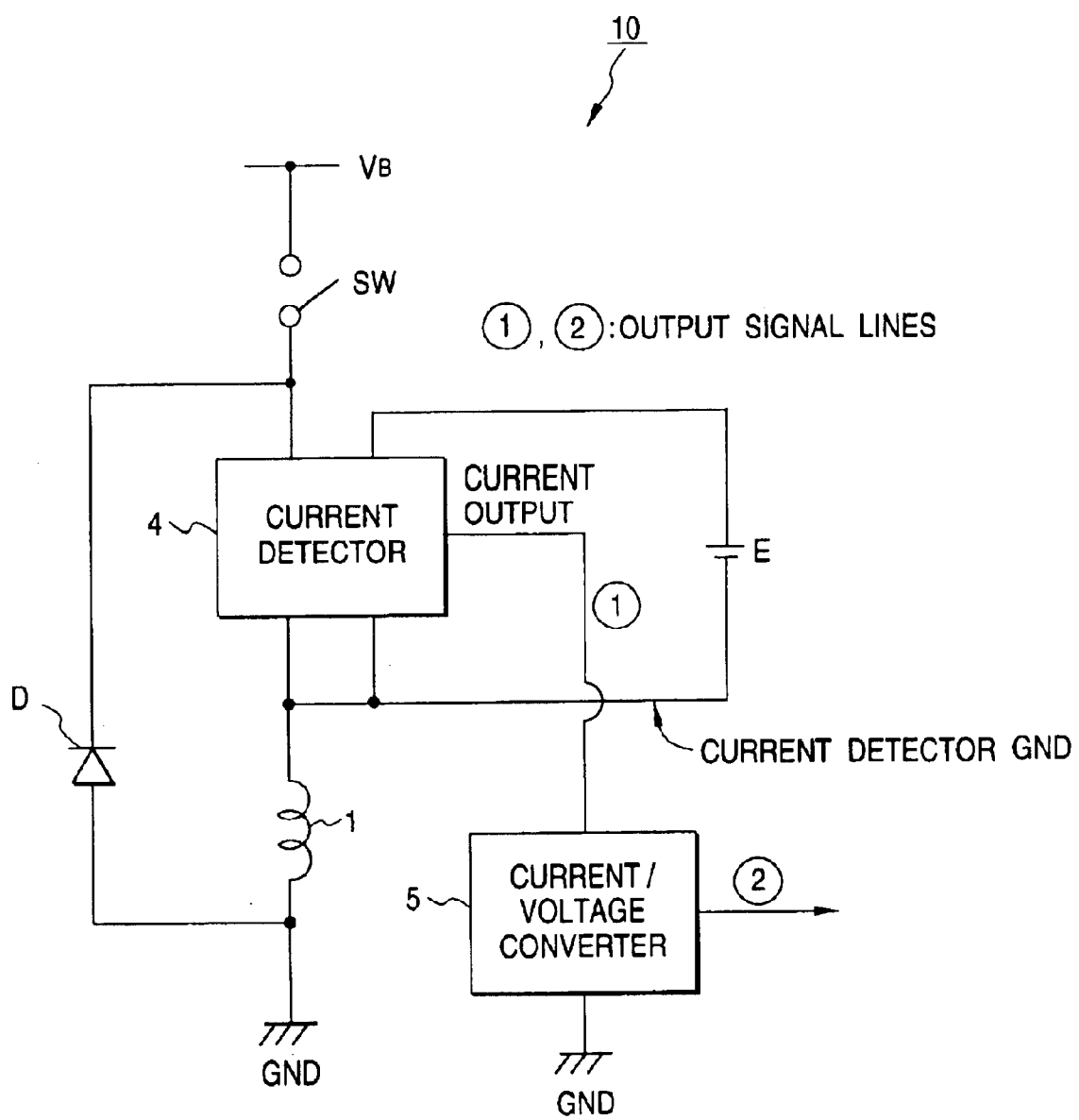
FIG. 4 is a construction diagram showing a construction of a solenoid driving device according to a first embodiment.

In FIG. 4, there is shown the construction which considers a power source for driving the current detector 4 in the solenoid driving device 10 shown in FIG. 1. From FIG. 4, there are omitted the connector 3 and the signal lines 2A and 2B.

As shown in FIG. 4, the current detector 4 is connected with a DC power source E (as will be called the "detector power source E") for driving the current detector 4. The detector power source E is connected on its cathode side with the node between the current detector 4 and the solenoid 1. The line joining that node and the cathode side of the detector power source E is the ground of the current detector 4 (as will be called the "current detector ground"). In other words, the detector power source E grounds the high side of the solenoid 1.

In the current detector 4, on the other hand, the output terminal for outputting the detected result is connected with the input terminal of a current/voltage converter 5 connected with the GND. Those output terminal and input terminal are connected through an output signal line [1]. In this embodiment, the current detector 4 having detected the electric current to be fed to the solenoid 1 outputs an electric current according to the detected result. In short, the current detector 4 has an output mode of an electric current output.

The current/voltage converter 5 converts the electric current inputted from the current detector 4 through the output signal line [1], into a voltage and outputs the converted voltage from the output terminal. In short, the voltage signal of the GND reference is outputted from the output terminal of the current/voltage converter 5. The voltage signal is fed to a processor (e.g., an analog/digital converter) at a rear stage. The output terminal of the current/voltage converter 5 and the processor at the rear stage are connected through an output signal line [2].

With reference to FIGS. 5 to 8, here will be described the reason why the output mode of the current detector 4 is the current output.

Figure 5A:
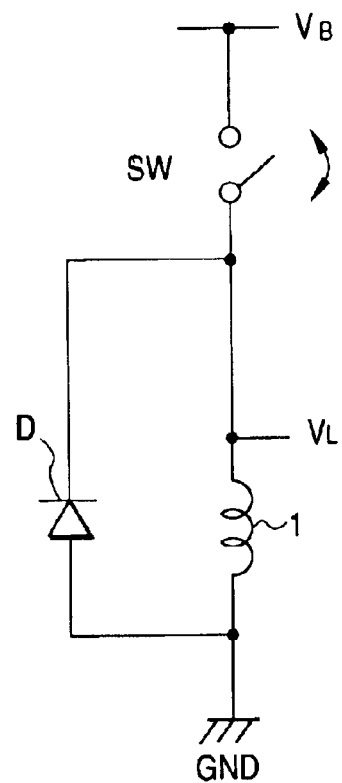
FIG. 5 is a diagram for explaining the ground for using a current output as an output mode of a current detector of the solenoid driving device according to the first embodiment and for converting the output current into a voltage signal on a GND reference.
Figure 6:
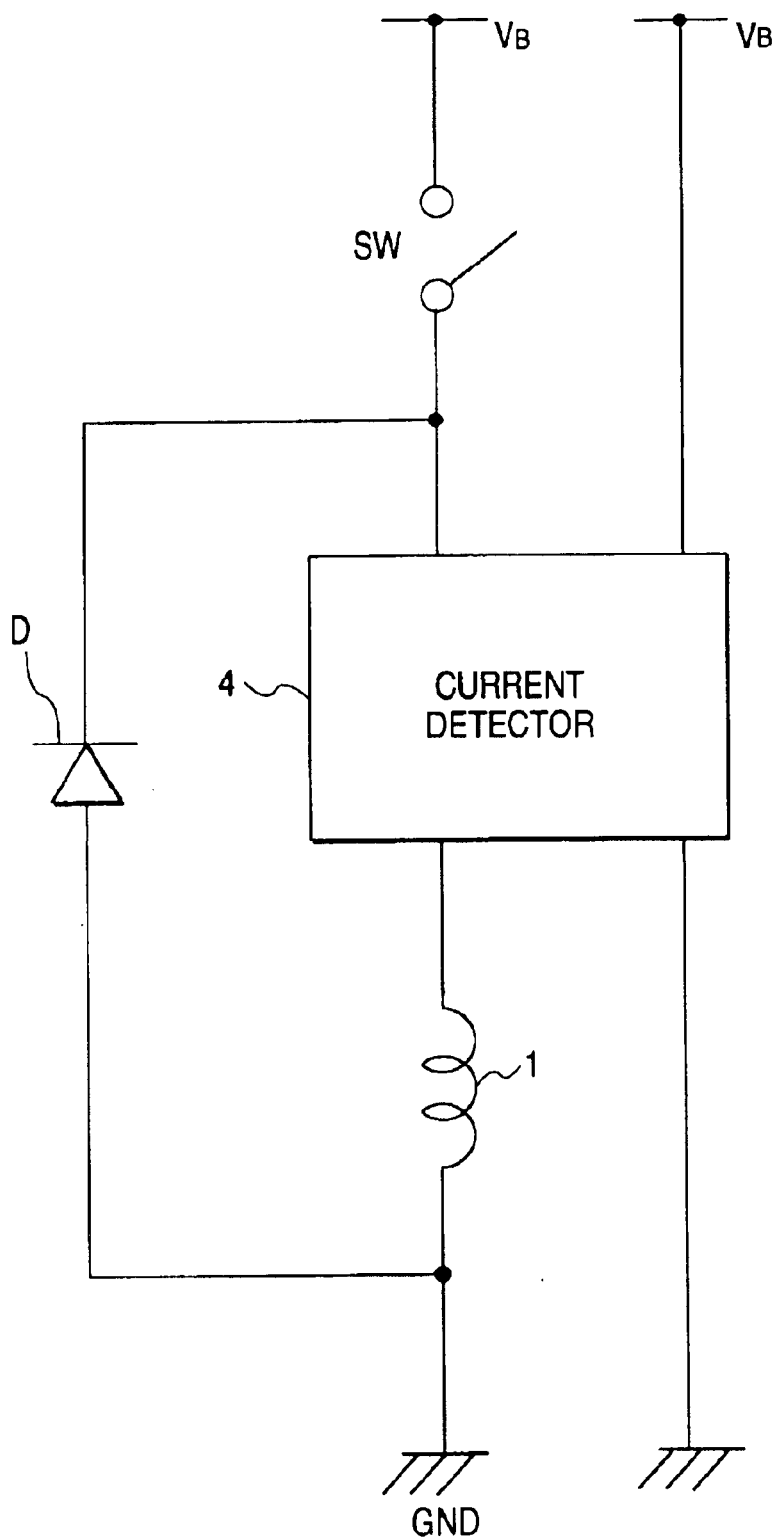
FIG. 6 is a diagram for explaining the ground for using a current output as an output mode of a current detector of the solenoid driving device according to the first embodiment and for converting the output current into a voltage signal on a GND reference.

When the switch SW is turned ON/OFF in the circuit shown in FIG. 5A in response a pulse-width modulation signal, the potential VL on the high side (or on the load power source side) of the solenoid 1 is equal, when the switch SW is ON, to the supply voltage of the load power source VB and, when the switch SW is OFF, to a voltage (−VF) inverted in the polarity sign from a forward voltage VF of the free-wheel diode D.

Where the current detector 4 of the GND reference is connected in the circuit construction of FIG. 5A between the solenoid 1 and the switch SW, as shown in FIG. 6, the input voltage has a range of −VF−VS to −VB−VS (wherein VS is a detected signal detected by the current detector 4) so that it exceeds the range (0 to VB) of the supply voltage of the current detector itself. Therefore, the current detector 4 cannot perform the detecting action normally.

Figure 7:
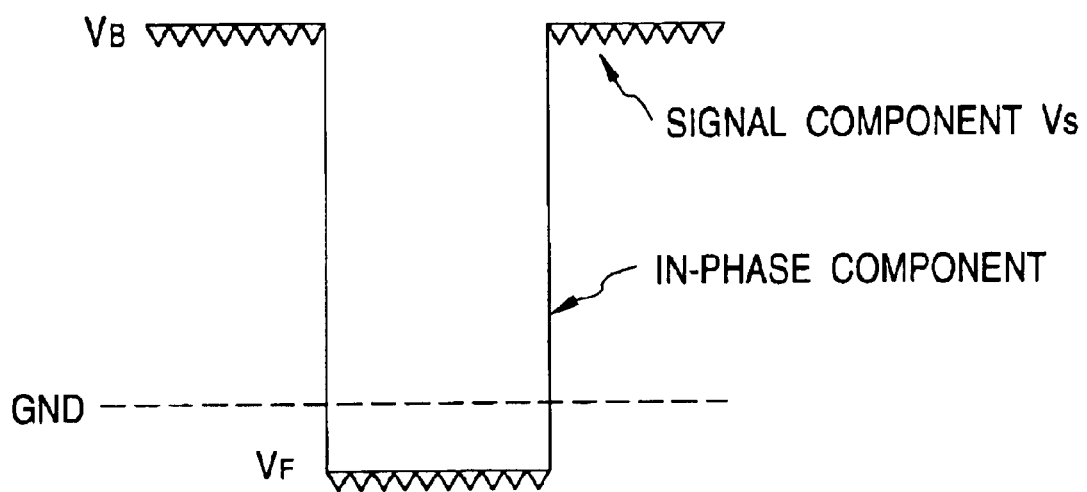
FIG. 7 is a diagram for explaining the ground for using a current output as an output mode of a current detector of the solenoid driving device according to the first embodiment and for converting the output current into a voltage signal on a GND reference.
Figure 8:
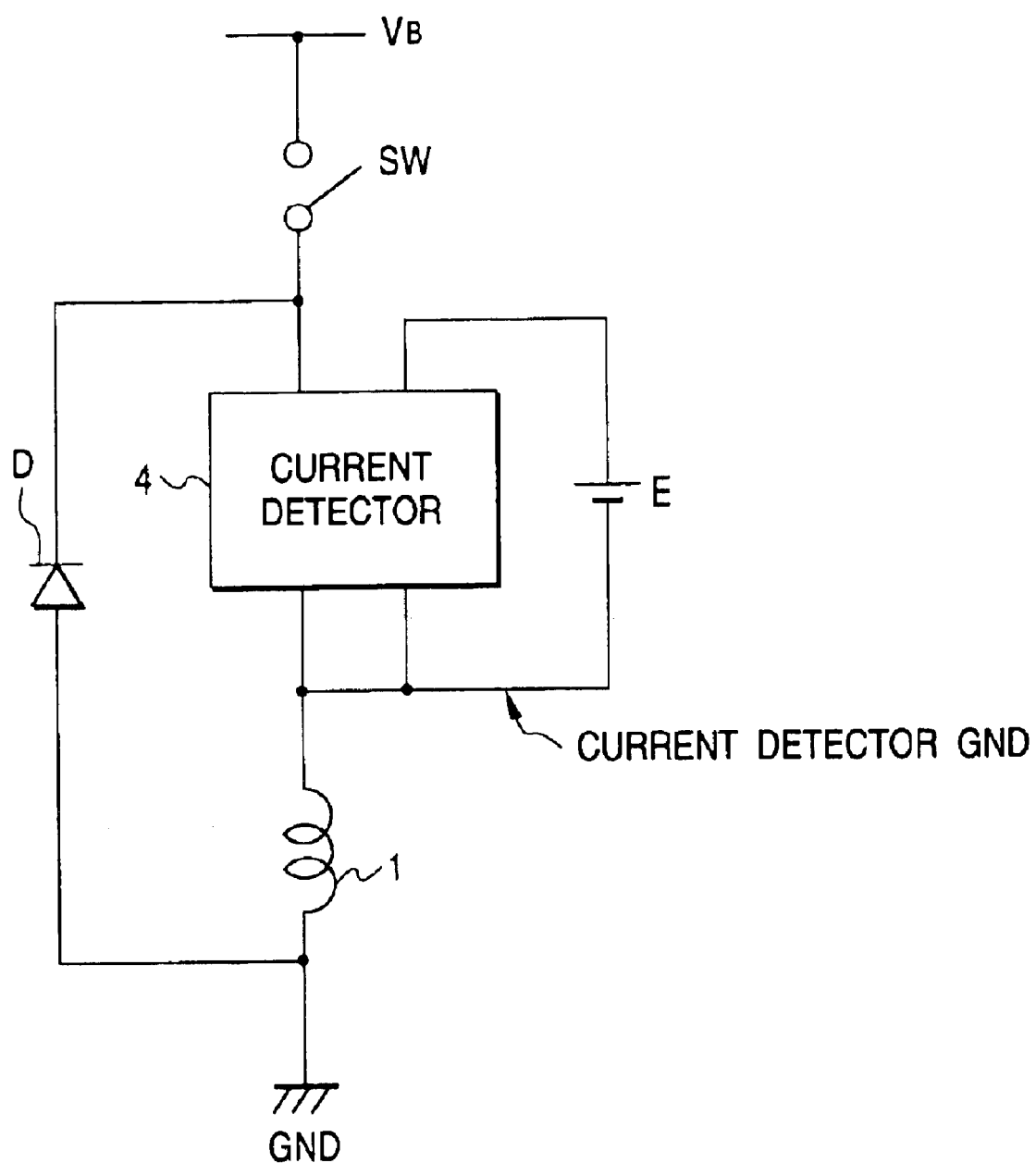
FIG. 8 is a diagram for explaining the ground for using a current output as an output mode of a current detector of the solenoid driving device according to the first embodiment and for converting the output current into a voltage signal on a GND reference.

In order to reduce the loss of the voltage feed to the load (i.e., the solenoid 1), on the other hand, the voltage drop component at the current detector 4 is usually reduced. This voltage drop component is set to about 100 mV, for example. Therefore, the input signal of the current detector 4 takes a state in which a small signal component (or the detected signal VS) is superposed on a large in-phase component, as illustrated in FIG. 7. It is difficult to extract only the detected signal VS precisely from that signal.

Where the current detector 4 is disposed together with the detector power source E on the high side with respect to the solenoid 1 so as to solve the difficulty, as shown in FIG. 8, the input signal is only the small detected signal VS, as viewed from the current detector 4, so that a stable detecting action can be done.

Figure 5B:
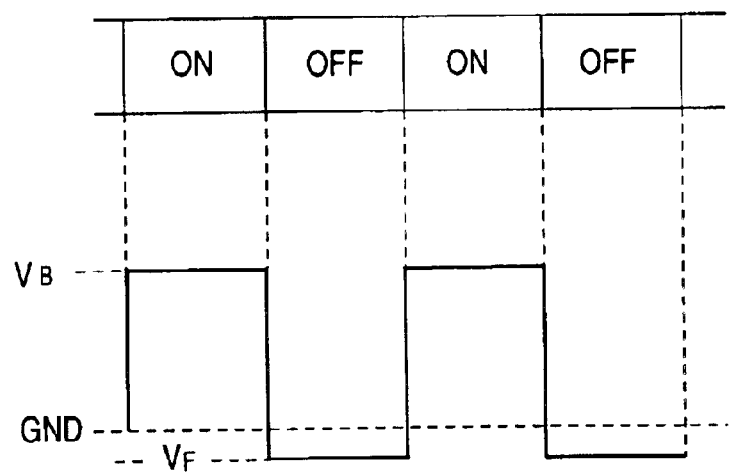

In the circuit construction shown in FIG. 8, however, the entire potential of the current detector 4 looks, from the GND, as if the potential "VB" and the potential "−VF" are alternated, as shown in FIG. 5B. With the voltage output of the current detector 4 of its ground reference, therefore, the stable detected signal VS of the GND reference is not obtained.

In this embodiment, therefore, the output mode of the current detector 4 is the current output, and the output electric current from the current detector 4 is converted into the voltage signal of the GND reference through the current/voltage converter 5, as shown in FIG. 4.

Next, the construction of the current detector 4 having the current output in the output mode will be described with reference to FIG. 9.

Figure 9:
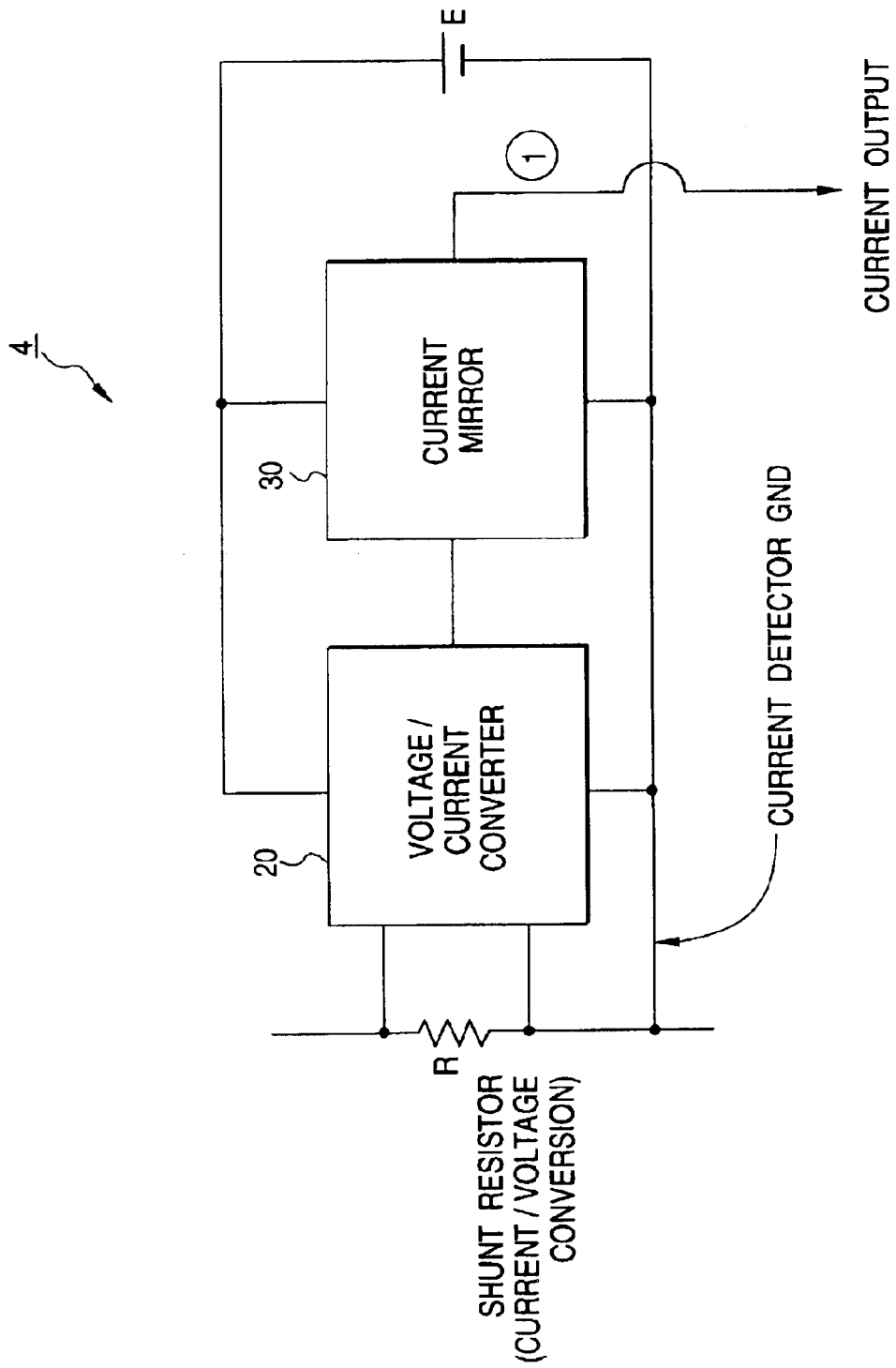
FIG. 9 is a construction diagram showing a construction of the current detector of the solenoid driving device according to the first embodiment.

FIG. 9 shows a detailed construction diagram of the current detector 4. In FIG. 9, the current detector 4 is constructed of: a shunt resistor R connected in series between the switch SW and the solenoid 1 (i.e., the connector 3); a voltage/current converter 20 for detecting the difference (or the potential difference) between the potentials to be generated at the two ends of the shunt resistor R, when an electric current flows through the shunt resistor R, and for converting the potential difference into an electric current; and a current mirror 30 for outputting an electric current corresponding to the electric current which has been converted by the voltage/current converter 20.

The shunt resistor R employed has a resistance for the voltage (e.g., 100 mV) of the aforementioned voltage drop when a rated electric current is fed to the solenoid 1.

The current mirror 30 is used for outputting an electric current signal to the outside.

The supply voltage of the detector power source E is fed (or applied) as a power source for driving the voltage/current converter 20 and the current mirror 30.

The terminal portion of the shunt resistor R on the side of the solenoid 1, the voltage/current converter 20 and the current mirror 30 are connected with the cathode side of the detector power source E. In short, these individual components are connected with the current detector ground.

Here in the current detector 4 shown in FIG. 9: the electric current to flow to the solenoid 1 is subjected to the current/voltage conversion at the shunt resistor R; the voltage thus converted is subjected to the voltage/current conversion at the voltage/current converter 20; and the electric current thus converted is outputted as an output electric current from the current mirror 30. Therefore, the current detector 4 performs in its entirety the current/current conversion with reference to the current detector ground. In this case, the output current has a value different from that of the input current.

This means that, the input signal shown in FIG. 7 has only a small current signal component as seen from the current detector 4, although it is inputted to the current detector 4 as seen from the GND. With the GND reference, therefore, the detected current component (or the current signal component) can be extracted by performing the current/current conversion with reference to the aforementioned current detector ground from the detector construction having a low S/N ratio.

In the current detector 4 thus far described, the potential to be generated at the shunt resistor R refers to the current detector ground. Even where the input signal shown in FIG. 7 is inputted, therefore, the input signal has only a small current signal component (i.e., the electric current to flow through the shunt resistor with reference to the current detector ground=the shut current), as viewed from the current detector 4, so that the S/N ratio of the shunt current can be improved.

When the switch SW is turned ON/OFF, as shown in FIG. 5A, on the other hand, the potential VL on the high side of the solenoid 1 becomes the power supply voltage of the load power source VB, when the switch SW is ON, as shown in FIG. 5B, with reference to the GND, and becomes the voltage "−VF" corresponding to the forward voltage of the free-wheel diode D, when the switch SW is OFF.

In this embodiment, however, the terminal portion of the shunt resistor R on the side of the solenoid 1 and the voltage/current converter 20 are connected with the cathode side (i.e., the current detector ground) of the detector power source E grounding the high side of the solenoid 1. For the shunt resistor R and the voltage/current converter 20, therefore, it is sufficient to consider the potential for the common reference point (i.e., the current detector ground).

Even where the switch SW is turned OFF so that the potential VL on the high side of the solenoid 1 changes to the voltage "−VF" with reference to the GND, the difference between the potentials at the two ends of the shunt resistor R takes a voltage which is determined by a product of the resistance of that resistor and the current value of the electric current (i.e., the current to flow to the solenoid 1) to flow to the shunt resistor R.

This voltage (or the shunt voltage) is the voltage (e.g., 100 mV) of the aforementioned voltage drop when the rated current is fed to the solenoid 1. Even in the case of the free-wheel diode D, as shown in FIG. 4, therefore, the shunt voltage is confined within the range (of 0 to VB) of the supply voltage of the current detector 4. Therefore, it is possible to perform the detecting action of the current detector 4, especially, the voltage/current converter 20 normally.

Figure 10:
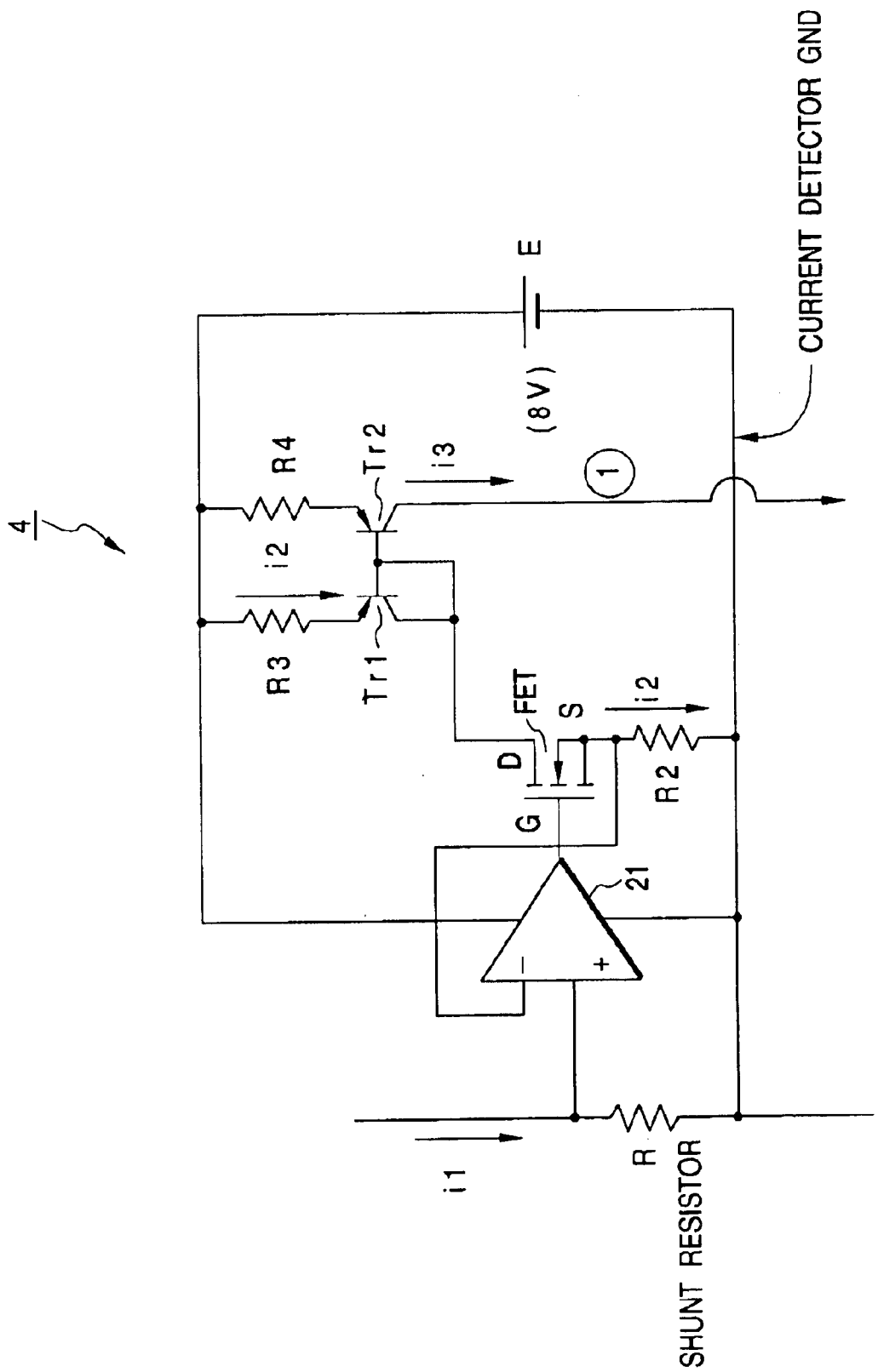
FIG. 10 is a construction diagram showing a more detailed construction of the current detector shown in FIG. 9.

Next, the current detector 4 showing the voltage/current converter 20 and the current mirror 30 in more detail is shown in FIG. 10.

In FIG. 10, the voltage/current converter 20 is composed of an operation amplifier 21, a field effect transistor FET and a resistor R2, and the current mirror 30 is composed of two transistors Tr1 and Tr2 and two resistors R3 and R4.

The operation amplifier 21 has its + supply terminal and − supply terminal connected with the anode side and the cathode side of the detector power source E, respectively. Here, the supply voltage of the detector power source E is set to such a voltage (or supply voltage), e.g., 8 V that the operation amplifier 21 can normally act.

In the voltage/current converter 20, the operation amplifier 21 has its + input terminal connected with one terminal of the shunt resistor R on the side of the switch SW, its − input terminal connected with the source S of the field effect transistor FET and its output terminal connected with the gate G of the field effect transistor FET.

The field effect transistor FET has its source S connected with the other end of the resistor R2, one end of which is connected with the cathode side of the detector power source E, and its drain D connected with the base and collector of the transistor Tr1.

The transistor Tr1 and the transistor Tr2 composing the current mirror 30 have their bases connected with each other, and the emitter of the transistor Tr1 is connected with the other end of the resistor R3, the one end of which is connected with the anode of the detector power source E. On the other hand, the transistor Tr2 has its emitter connected with the other end of the resistor R4, the one end of which is connected with the anode of the detector power source E, and its collector connected through the output signal line [1] with the current/voltage converter 5 shown in FIG. 4.

Here, the two transistors Tr1 and Tr2 basically have to be used in a pair with identical characteristics. As a matter fact, however, it is difficult to use the transistors of the identical characteristics in the pair. In order to compensate this difficulty, therefore, the resistors R3 and R4 are connected between the respective emitters and the anode of the detector power source E.

Here will be described the actions of the current detector 4 thus constructed.

Here, the shunt resistor R has a resistance r1, and the resistor R2 has a resistance r2.

Now, let it be assumed that the electric current i1 flows to the shunt resistor R1 at the ground reference of the current detector. Then, the difference between the potentials at the two ends of the shunt resistor R1 has a voltage value which is determined by "r1×i1" and which is applied to the + input terminal of the operation amplifier 21. From the relation in which the two input terminals of the operation amplifier 21 are imaginarily shorted, moreover, the potential of the − input terminal of the operation amplifier 21 takes the voltage value determined by "r1×i1".

Now, when the potential of the voltage value determined by "r1×i1" is applied to the + input terminal of the operation amplifier 21, a predetermined voltage is outputted from the output terminal of the operation amplifier 21 and is applied to the gate of the field effect transistor FET to change the field effect transistor FET from the OFF state to the ON state. When the field effect transistor FET is turned ON, moreover, the predetermined voltage is applied to the individual bases of the transistors Tr1 and Tr2 so that these transistors are changed from the OFF state to the ON state.

To the node between the source S of the field effect transistor FET and the resistor R2, on the other hand, there is applied the voltage of the value, as determined by "r1×i1", from the − input terminal of the operation amplifier 21.

As a result, the resistor R2 passes the electric current (as designated by i2) which has the current value determined by (r1×i1)/r2. This means that the transistor Tr1 passes the electric current i2 from its emitter to its collector through the resistor R3. When the electric current i2 thus flows through the transistor Tr1, the transistor Tr2 also passes an electric current (as designated by i3) at the same value as that of the electric current i2 from its emitter to its collector through the resistor R4.

Through the collector of the transistor Tr2, i.e, the output signal line [1], more specifically, there flows the electric current i3 (=i2=(r1/r2)×i1) which is proportional to the electric current i1 to flow through the shunt resistor R.

Figure 11:
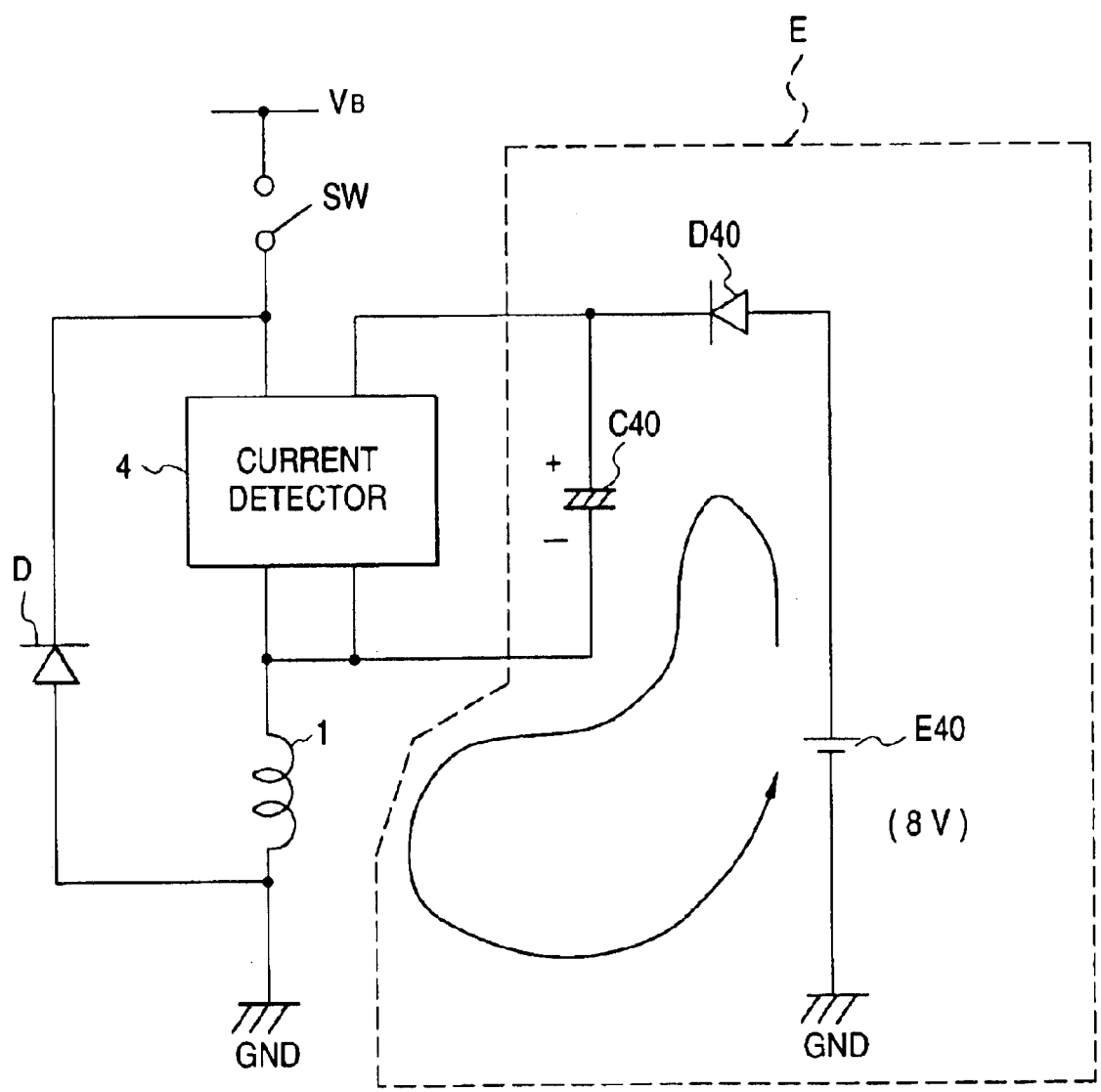
FIG. 11 is a construction diagram showing a construction of a detector power source of the solenoid driving device according to the first embodiment.

FIG. 11 is a construction diagram showing a construction of the detector power source E in more detail, in the solenoid driving device 10 shown in FIG. 4. Here are omitted the output signal lines [1] and [2] and the current/voltage converter 5.

In the detector power source E, the voltage of a DC power source E40 having its cathode side connected with the GND is applied to an electrolytic capacitor C40 through a diode D40 so that a charging current flows. Thus, the charging voltage of the electrolytic capacitor C4, as charged by the charging current, is fed as the supply voltage to the current detector 4. In other words, the current detector 4 employs a power source (i.e., the charging voltage of the electrolytic capacitor C40) different from that of the load power source VB.

Therefore, the DC power source E40 can have the supply voltage according to such a voltage (i.e., the supply voltage), e.g., 8 V that the operation amplifier 21 can normally act. On the other hand, the breakdown voltage of the electrolytic capacitor C40 can also be set to a voltage according to the supply voltage (e.g., 8 V) of the operation amplifier 21.

In this detector power source E, when the switch SW is OFF, the supply voltage of the DC power source E40 is applied to the + electrode of the electrolytic capacitor C40 through the diode D40 in the ON state. Then, this electrolytic capacitor C40 is charged by the charging current (as indicated by a solid arrow in FIG. 11) flowing through the solenoid 1 and the GND.

When the switch SW is turned ON from its OFF state, on the other hand, the potential on the high side of the solenoid 1 takes a voltage (at about 28 V) substantially equal to the load power source VB so that the diode D40 is changed from its ON to OFF state. As a result, the electrolytic capacitor C40 is not charged with the DC power source E40, but the existing charging voltage is fed to the current detector 4.

With the switch SW thus repeating the ON/OFF actions, the electrolytic capacitor C40 alternately repeats the charging action and the feed of the charging voltage to the current detector 4, as has been described hereinbefore.

Specifically, the electrolytic capacitor C40 has its charging voltage lowered with the feed of the charging voltage to the current detector 4 but is charged by the DC power source E40 in the next OFF operation in the switching action of the switch SW according to the duty ratio of the pulse-width modulation signal. For the charging voltage, therefore, it is possible to warrant the supply voltage of the current detector 4 such as the supply voltage (at 8 V, for example) of the operation amplifier 21.

Here, the detector power source E can be given the simple construction, as described above. This is because the supply voltage is fed to the current detector 4 for detecting the electric current to flow to the solenoid 1 as the switch SW switches according to the duty ratio of the pulse-width modulation signal.

Figure 12:
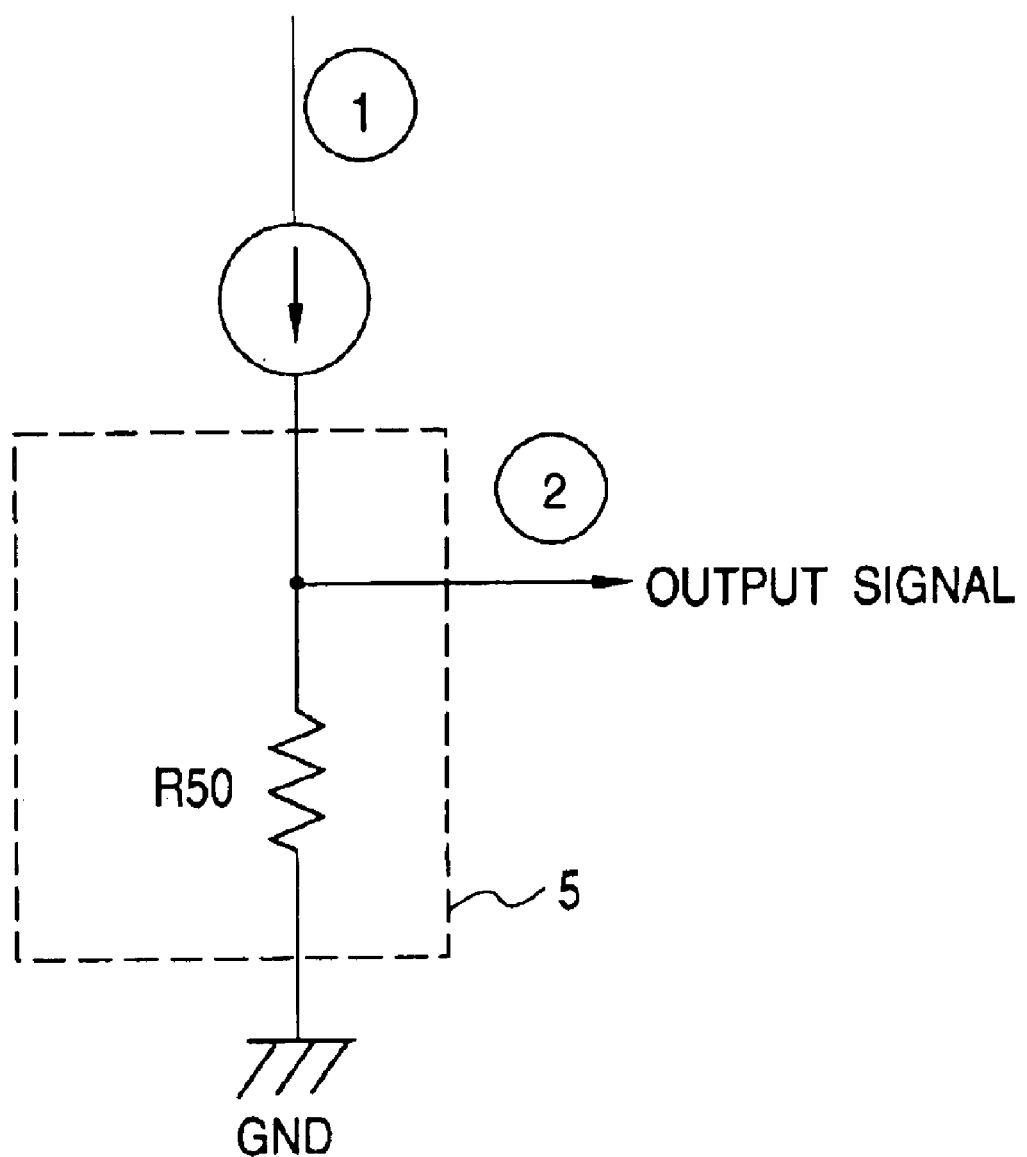
FIG. 12 is a construction diagram showing a construction of a current/voltage converter of the solenoid driving device according to the first embodiment.

FIG. 12 is a construction diagram showing a construction of the current/voltage converter 5 in detail in the solenoid driving device 10 shown in FIG. 4.

In the current/voltage converter 5, as shown in FIG. 12, a resistor R50 having a resistance r50 is connected between the output signal line [1] from the current detector 4 and the GND. With the node between the output signal line [1] and the resistor R50, on the other hand, there is connected the output signal line [2] for outputting the potential (i.e., the potential difference between the two ends of the resistor R50 connected at its one end with the GND) of the resistor R50 on its node side. In short, the detected signal (or the detected voltage signal) of the GND reference is outputted from the output signal line [2].

For example, the electric current i3 according to the product of the electric current i1 having flown through the shunt resistor R and the gain (i.e., r1/r2) flows through the transistor Tr2 and the output signal line [1] of the current detector 4, as shown in FIG. 10, to the resistor R50 of the current/voltage converter 5 shown in FIG. 12, the voltage (or the potential), as determined by the product of that electric current i3 and the resistance r50 of the resistor R50, is outputted from the output signal line [2].

Figure 13:
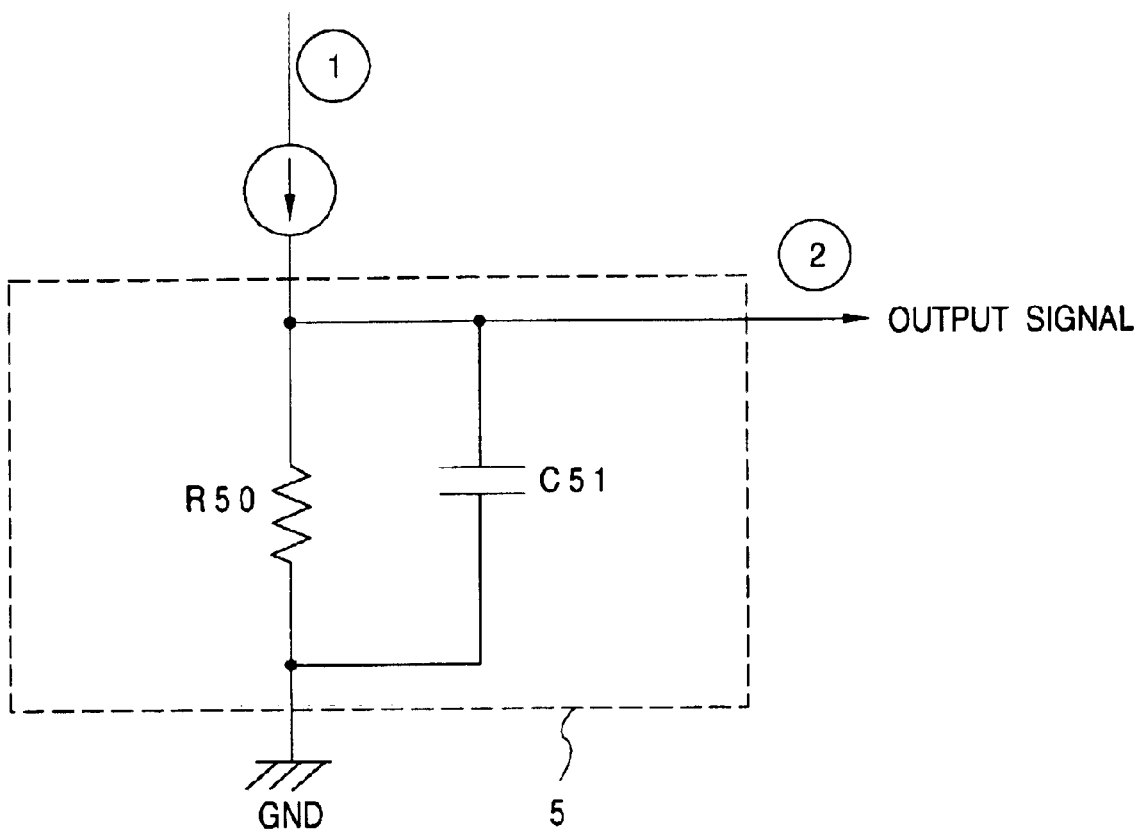
FIG. 13 is a construction diagram showing an application of the current/voltage converter shown in FIG. 12.

An application of this current/voltage converter 5 is shown in FIG. 13. In this application, in order to average the output voltage (or the output signal) from the output signal line [2], a capacitor C51 is disposed in parallel with the resistor R50 in the circuit construction shown in FIG. 12.

Figure 14:
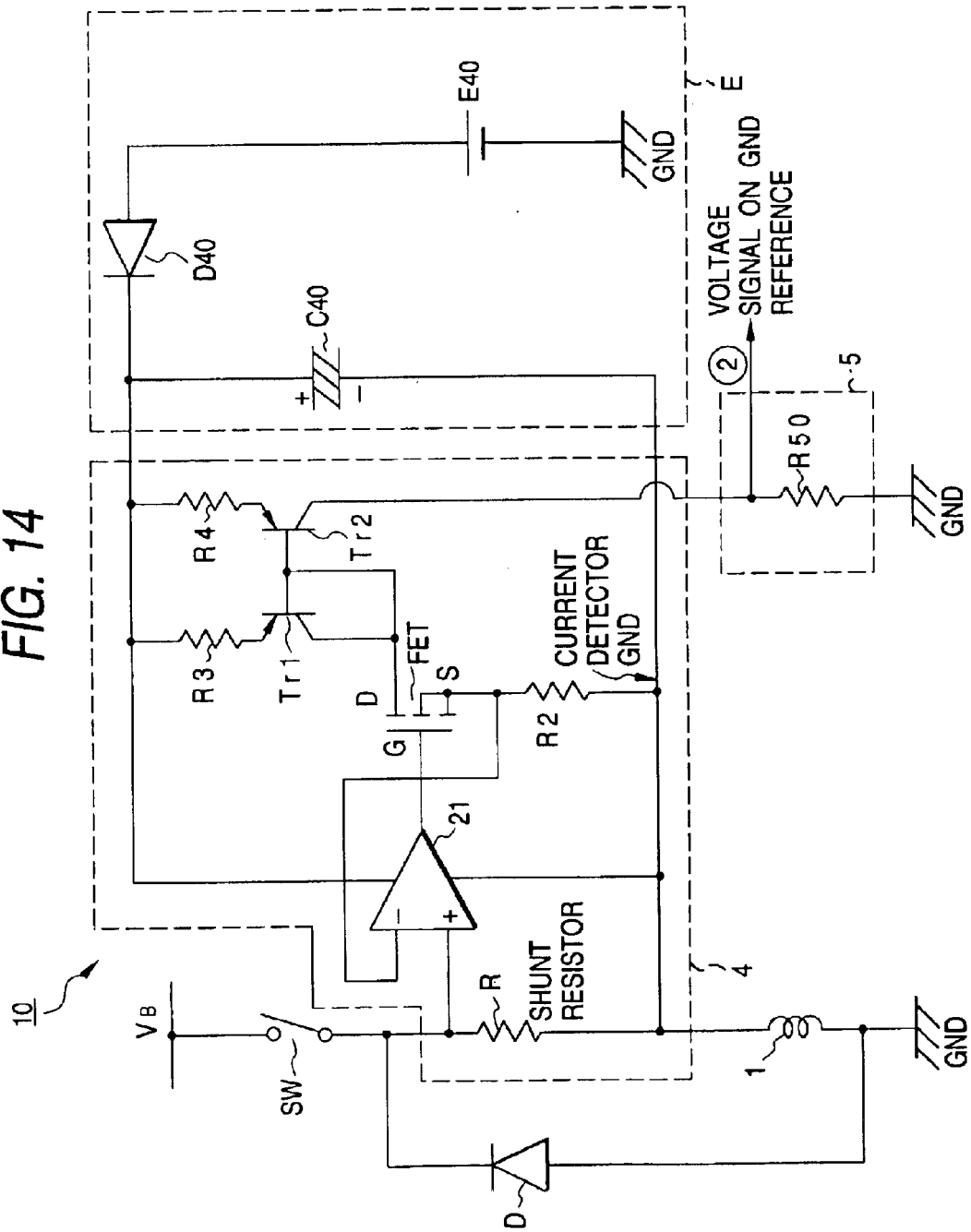
FIG. 14 is a construction diagram showing the current detector, the detector power source and the current/voltage converter of the solenoid driving device according to the first embodiment shown in FIG. 4, with the construction of the individual components shown in FIGS. 10 to 12.

Next, in connection with the solenoid driving device 10 shown in FIG. 4, the entire construction diagram expressing the current detector 4, the detector power source E and the current/voltage converter 5 in the circuit construction of the individual components shown in FIGS. 10 to 12 is presented in FIG. 14. The detail of the entire construction diagram has already been described, and its description will be omitted.

The following effects can be obtained according to this embodiment thus far described.

(1) The current detector 4 is connected between the solenoid 1 and the switch SW and on the high side (or on the load power source side) with respect to the solenoid. Where a plurality of solenoids are to be driven and controlled by the (not-shown) controller in the solenoid driving device 10, therefore, the plurality of (N) solenoids can be made common on the GND sides, and the number of signal lines for connecting the controller and the (N) solenoids may be the value which is determined by "the number (N) of solenoids+1".

According to this embodiment, therefore, the number of signal lines can be drastically reduced, as compared with the aforementioned solenoid driving device of the prior art in which the number of signal lines required has been the value determined by "the number (N) of solenoids×2".

Thus, it is possible to reduce the number of signal lines. This means that the imperfect contact with the GND-connected vehicle due to the exposure of the conductive portions of the signal lines can be reduced as the number of signal lines is reduced.

(2) Where the GND sides of the plurality of (N) solenoids are made common, as described above, on the other hand, the number of signal lines to connect the controller and the plurality of (N) solenoids may be the value determined by "the number (N) of solenoids+1". Therefore, the terminal number (or the pin number) of the connector 3 to be disposed in the controller may also be the value determined by "the number (N) of solenoids+1".

According to this embodiment, therefore, the pin number of the connector can be drastically reduced, as compared with the aforementioned solenoid driving device of the prior art in which the pin number of the connector required has been the value determined by "the number (N) of solenoids× 2".

On the other hand, the pin number of the connector can be reduced to reduce the imperfect contact of the node at the connector can be reduced according to the reduction in the pin number.

Moreover, the size (or the area of the printed wiring region) of a printed substrate, in which the connector having the pin number drastically reduced from that of the prior art is arranged, can be resultantly reduced to make the solenoid driving device itself compact.

(3) Moreover, the current detector 4 is disposed on the high side with respect to the solenoid 1. Even where the conductive portions of the signal lines contact with the car body connected with the ground so that the solenoid 1 is grounded to the earth, therefore, the overcurrent can be detected by the current detector 4. It is possible to detect the imperfect grounding or the most serious problem. Of course, it is also possible to detect the complete grounding.

The current detector 4 also has the function of the overcurrent detector so that this embodiment need not be provide the overcurrent detector unlike the prior art.

According to this embodiment, therefore, the switch SW and the solenoid 1 can be prevented from being troubled by the overcurrent. Moreover, the maintenance can be quickly made by informing the outside of the occurrence of the overcurrent (or the grounding).

[Second Embodiment]

This second embodiment is different from the first embodiment in that the current detector has a different construction.

Figure 15:
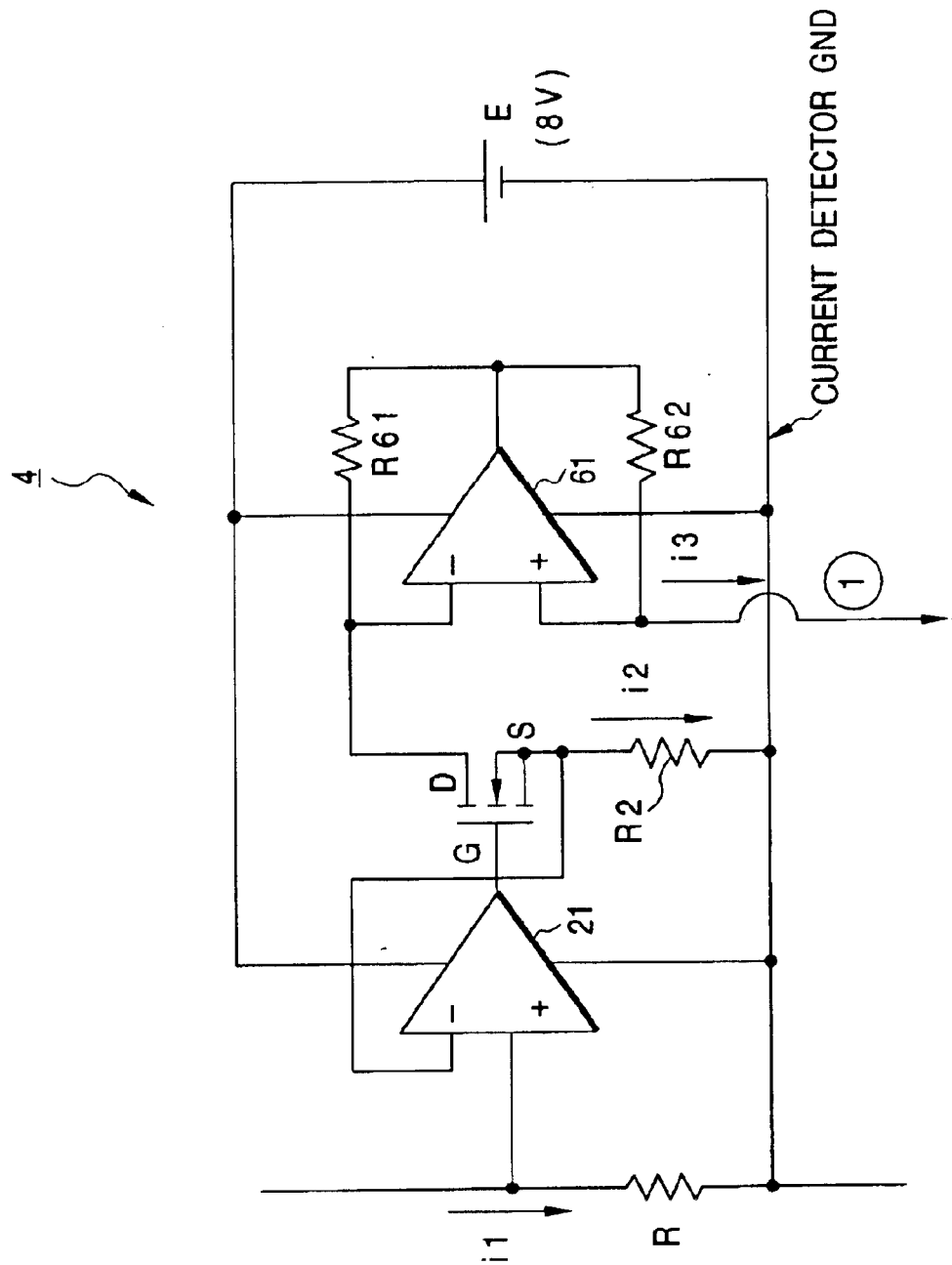
FIG. 15 is a construction diagram showing a construction of a current detector in a solenoid driving device according to a second embodiment.

FIG. 15 is a construction diagram showing a circuit construction of the current detector 40 in a solenoid driving device according to the second embodiment.

This current detector 4 is constructed by eliminating the two transistors Tr1 and Tr2 and the two resistors R3 and R4 from and by adding an operation amplifier 61 and resistors R61 and R62 to the construction of the current mirror 30 of the current detector 4 in the first embodiment shown in FIG. 10. Here in FIG. 15, the portions for performing the same functions as those of the components shown in FIG. 10 are designated by the common reference numerals.

The operation amplifier 61 is connected at its − input terminal with the drain of the field effect transistor FET and one end of the resistor R61, at its + input terminal with one end of the resistor R62, and at is output terminal with the other ends of the resistor R61 and R62. The node between the + input terminal and the one end of the resistor R62 can be connected through the output signal line [1] with the current/voltage converter 5. Here, the resistor R61 has a resistance r61, and the resistor R62 has a resistance r62.

Here will be described the actions of the current detector 4 in the second embodiment.

Now, let it be assumed that the electric current i1 flows to the shunt resistor R at the ground reference of the current detector. Then, the difference between the potentials at the two ends of the shunt resistor R has a voltage value which is determined by "r1×i1" and which is applied to the + input terminal of the operation amplifier 21. From the relation in which the two input terminals of the operation amplifier 21 are imaginarily shorted, moreover, the potential of the − input terminal of the operation amplifier 21 takes the voltage value determined by "r1×i1".

Now, when the potential of the voltage value determined by "r1×i1" is applied to the + input terminal of the operation amplifier 21, a predetermined voltage is outputted from the output terminal of the operation amplifier 21 and is applied to the gate of the field effect transistor FET to change the field effect transistor FET from the OFF state to the ON state.

To the node between the source S of the field effect transistor FET and the resistor R2, on the other hand, there is applied the voltage of the value, as determined by "r1×i1", from the − input terminal of the operation amplifier 21. As a result, the resistor R2 passes the electric current (as designated by i2) which has the current value determined by (r1×i1)/r2. This current i2 flows to the resistor R61, too.

On the other hand, the potential difference between the two input terminals of the operation amplifier 61 is 0 V from the imaginary short relation so that the voltage determined by the product of the current i2 and the resistance r61 of the resistor R61 is applied to the + input terminal of the operation amplifier 61. In short, the electric current (as called "i3") of the current value determined by (r61×i2)/r62 flows through the resistor R62.

Here if r61=r62, the electric current (i.e., the current i3) to flow through the resistor R62 to the current/voltage converter 5 is the electric current i3 (=i2=(r1/r2)×i1) which is proportional to the electric current i1 to flow through the shunt resistor R. Of course, the electric current i3 can also be made the value different from that of the electric current i2 by making the resistance r61 and the resistance r62 different.

According to the second embodiment, as has been described hereinbefore, it is possible to expect effects similar to those of the foregoing first embodiment.

[Third Embodiment]

This third embodiment is different from the first and second embodiments in that the construction of the detector power source is different.

Figure 16:
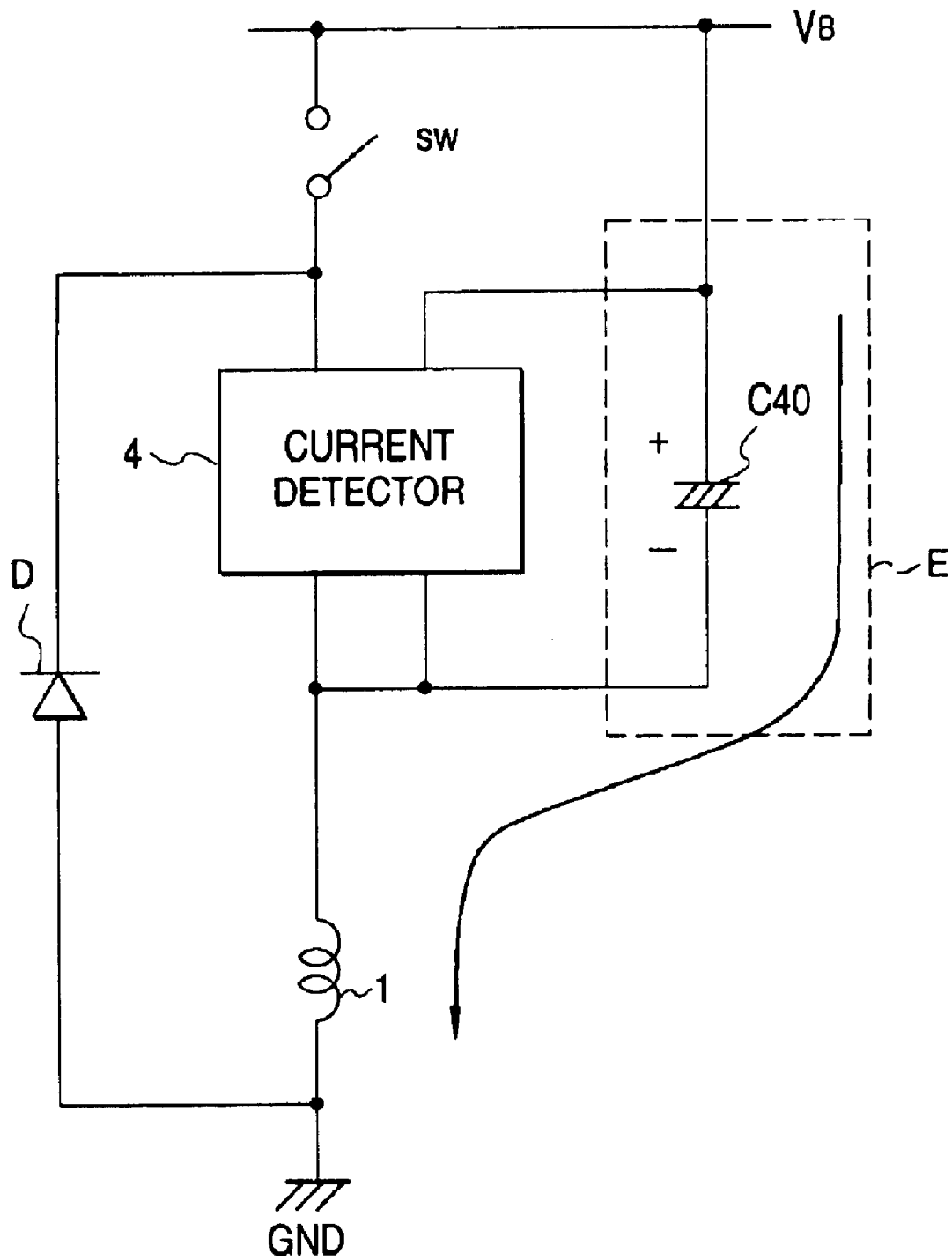
FIG. 16 is a construction diagram showing a construction of a detector power source in a solenoid driving device according to a third embodiment.

FIG. 16 is a construction diagram showing a circuit construction of the detector power source E in a solenoid driving device according to a third embodiment.

This detector power source E is constructed by eliminating the diode D40 and the power source E40 from the detector power source E shown in FIG. 11. Here in FIG. 16, the portions for performing the same functions as those of the components shown in FIG. 11 are designated by the common reference numerals.

In the detector power source E according to the third embodiment, as shown in FIG. 16, the electrolytic capacitor C40 is fed with a voltage from the load power source VB so that the charging current flows.

In this detector power source E, too, as in the detector power source E of the first embodiment shown in FIG. 11, the supply voltage of the load power source VB is applied to the + electrode of the electrolytic capacitor C40 when the switch SW is OFF. As a result, the electrolytic capacitor C40 is charged when the charging current flows (in the direction indicated by a solid arrow in FIG. 11) through the solenoid 1.

When the switch SW is changed from the OFF state to the ON state, on the other hand, the potential of the solenoid 1 on the high side, i.e., the − electrode side of the electrolytic capacitor C40 takes a potential (at about 28 V) substantially equal to that of the load power source VB, and the + electrode side of the electrolytic capacitor C40 also takes the potential (at about 28 V) substantially equal to that of the load power source VB. In the electrolytic capacitor C40, therefore, the charging is not done by the power source E40, but the existing charging voltage is fed to the current detector 4.

Thus, the switch SW repeats its ON/OFF actions so that the charging and the feed of the charging voltage to the current detector 4 are alternately repeated in the electrolytic capacitor C40, as described hereinbefore.

This detector power source E shown in FIG. 16 can be realized by using one electrolytic capacitor C40 so that the construction can be made simpler than that of the first embodiment.

On the other hand, the operation amplifier 21 (as referred to FIG. 10) of the current detector 4 to be employed has to employ the supply voltage which corresponds to the load power source VB, e.g., 28 V and which can endure that voltage sufficiently, that is, which has a high breakdown voltage. On the other hand, the electrolytic capacitor C40 to be employed also has to have a breakdown voltage capable of the supply voltage of the load power source VB, e.g., 28 V.

Next, another example of the detector power source in the solenoid driving device according to the third embodiment will be described with reference to FIG. 17 and FIGS. 18A and 18B.

Figure 17:
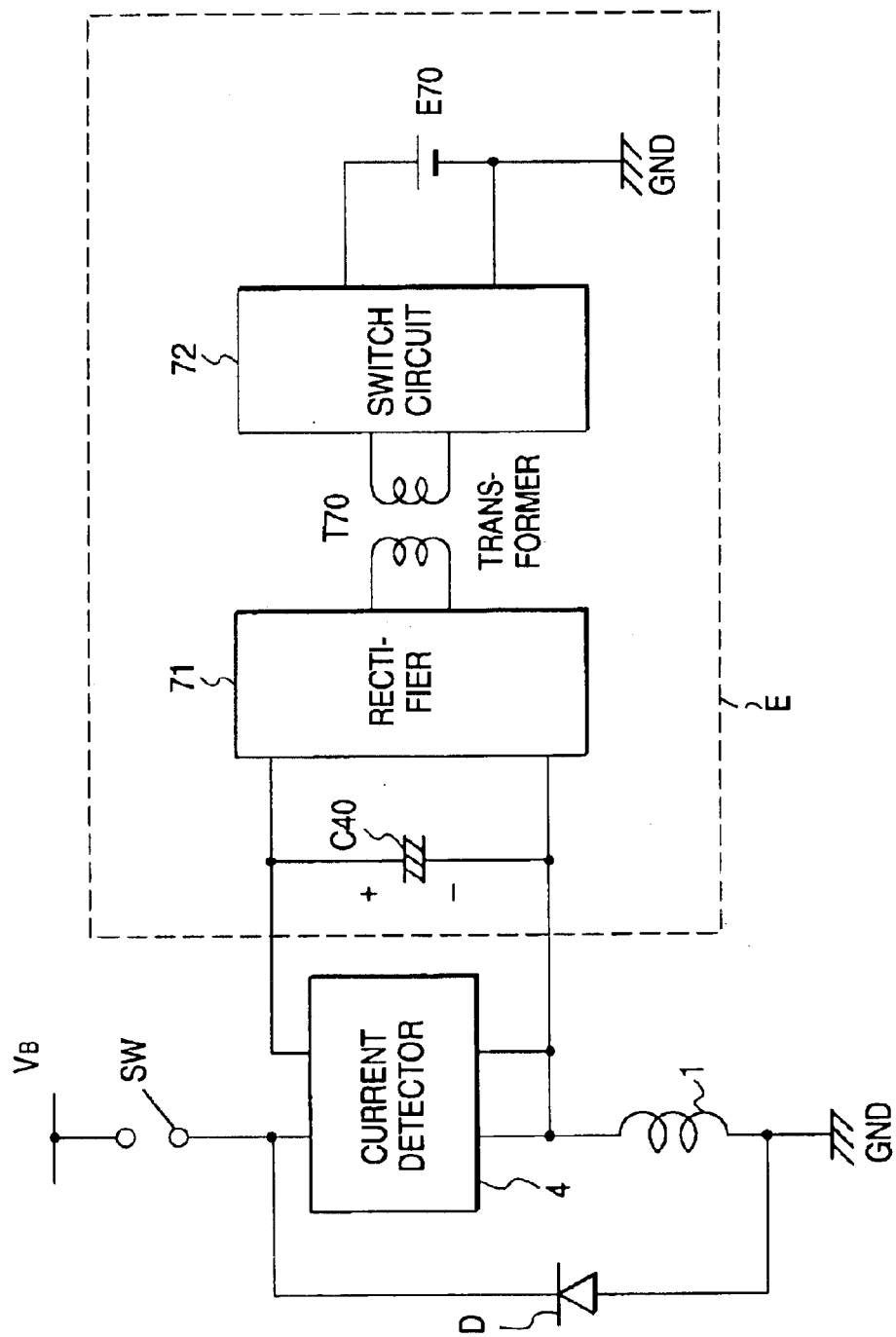
FIG. 17 is a construction diagram showing a construction of another detector power source in the solenoid driving device according to the third embodiment.

The detector power source E shown in FIG. 17 is constructed by eliminating the diode D40 and the power source E40 from and by adding a rectifier 71, a switch circuit 72, a transformer T70 and a power source E70 to the detector power source E shown in FIG. 11. Here in FIG. 17, the portions for performing the same functions as those of the components shown in FIG. 11 are designated by the common reference numerals.

In this detector power source E, the supply voltage of the DC power source E70 is fed to the electrolytic capacitor C40 through the switching switch circuit 72, the transformer T70 having primary and secondary coils at a predetermined ratio of the numbers of turns, and the rectifier 71.

Therefore, the operation amplifier 21 (as referred to FIG. 10) of the current detector 4 to be employed can have an arbitrary supply voltage (e.g., 8 V) without being influenced by the supply voltage of the load power source VB. On the other hand, the electrolytic capacitor C40 to be employed can also have a breakdown voltage corresponding to the supply voltage of the operation amplifier 21.

Figure 18A:
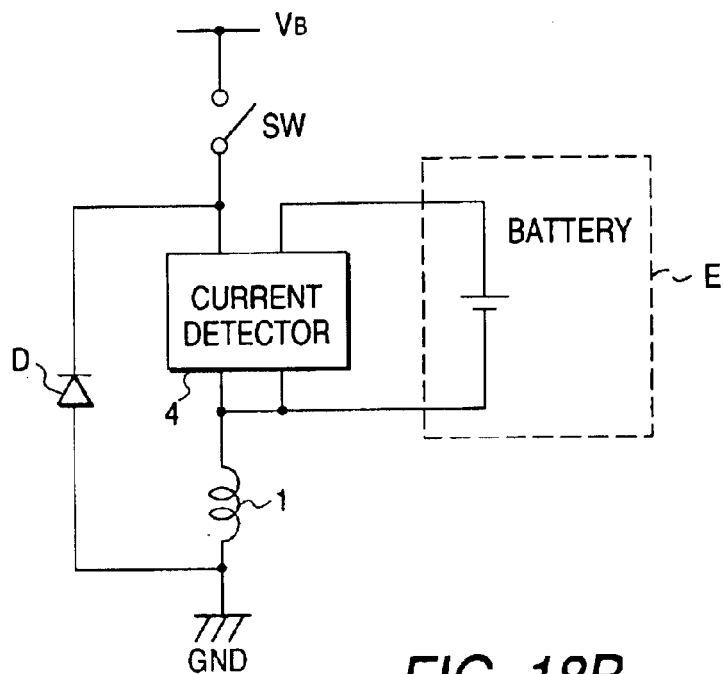
FIGS. 18A and 18B are construction diagrams showing constructions of other detector power sources in the solenoid driving device according to the third embodiment.

On the contrary, the detector power source E shown in FIG. 18A is constructed by eliminating the electrolytic capacitor C40, the diode D40 and the power source E40 from and by adding a battery BAT to the detector power source E shown in FIG. 11. Here in FIG. 18A, the portions for performing the same functions as those of the components shown in FIG. 11 are designated by the common reference numerals.

The battery BAT is assumed to have a voltage equivalent to the supply voltage of the operation amplifier 21 of the current detector 4. In this case, the voltage of the battery BAT can be fed to the current detector 4 at all times independently of the ON/OFF actions of the switch SW.

Figure 18B:
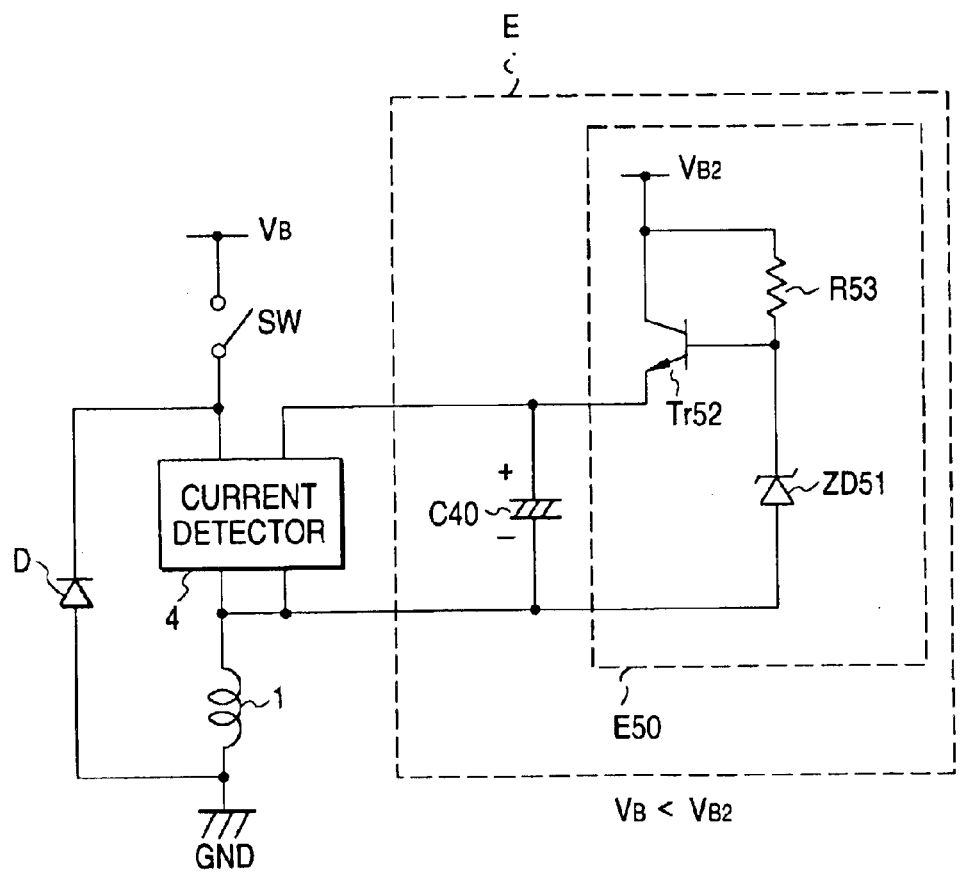

On the other hand, the detector power source E shown in FIG. 18B is constructed by eliminating the diode D40 and the power source E40 and by adding a constant voltage circuit E50 to the detector power source E shown in FIG. 11. Here in FIG. 18B, the portions for performing the same functions as those of the components shown in FIG. 11 are designated by the common reference numerals.

The constant voltage circuit E50 is composed of a Zener diode ZD51, a transistor Tr52 and a resistor R53. On the other hand, a power source VB2 is set to such a supply voltage as to satisfy a relation of "the voltage of the power source VB2>the voltage of the load power source VB+the voltage of the power source of the current detector (i.e., the supply voltage of the current detector 4)".

According to this construction of the detector power source E, the current detector 4 is fed at all times with a voltage equal to or higher than that of the current detector power source (or the supply voltage of the current detector 4) independently of the ON/OFF actions of the switch SW. Moreover, there is used a constant voltage circuit (e.g., a constant voltage circuit 50), as shown in FIG. 18B, so that a stable voltage can be fed at all times to the current detector 4.

According to the third embodiment, as has been described hereinbefore, it is possible to expect effects similar to those of the foregoing first and second embodiments.

[Fourth Embodiment]

This fourth embodiment is different from the first to third embodiments in that the construction of the current/voltage converter is different.

Figure 19:
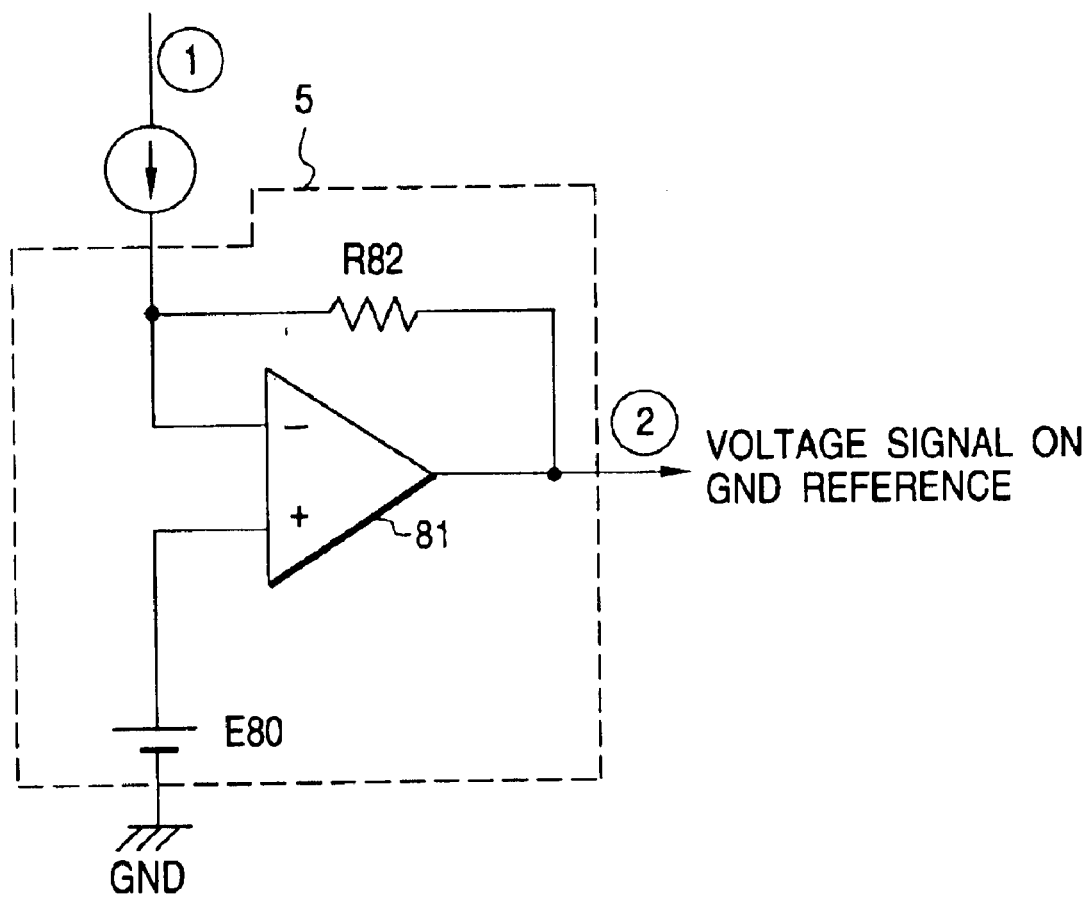
FIG. 19 is a construction diagram showing a construction of a current/voltage converter in a solenoid driving device according to a fourth embodiment.

FIG. 19 is a construction diagram showing a construction of the current/voltage converter 5 in a solenoid driving device according to the fourth embodiment.

In this current/voltage converter 5, as shown in FIG. 19, an operation amplifier 81 is connected at its + input terminal with the anode side of a DC power source E80, the cathode side of which is connected with the GND, at its − input terminal with one end of a resistor R82 and the output signal line [1], and at its output terminal with the other end of the resistor R82 and the output signal line [2].

Here will be described the actions of the current/voltage converter 5.

Here, it is assumed that the DC power source E80 has a voltage value Vin and that the resistor R82 has a resistance r82.

For example, it is assumed that the electric current i3 according to the product of the electric current i1 to flow through the shunt resistor R, as shown in FIG. 10, and the gain (r1/r2) flows through the transistor Tr2 of the current detector 4 and the output signal line [1] to the current/voltage converter 5 shown in FIG. 19.

In the current/voltage converter 5, the two input terminals of the operation amplifier 81 have an imaginary short relation so that its − input terminal is fed with a voltage at a value equal to that of the DC power source E80. On the other hand, the current i3 flows not to the − input terminal but to the resistor R82 so that a potential (or a voltage drop) determined by the product of the resistance r82 and the electric current i3 is established at the resistor 82. As a result, the voltage at the value determined by "Vin−(r82×i3)" is outputted from the output terminal of the operation amplifier 81.

Thus, the output voltage from the output terminal of the operation amplifier 81, i.e., from the output signal line [2] is the signal which is voltage-converted from the electric current i3 according to the product of the electric current i1 having flown through the shunt resistor R and the gain (r1/r2), that is, the detected signal (or the detected voltage signal) of the GND reference.

According to the fourth embodiment thus far described, it is possible to expect effects similar to those of the first to third embodiments.

[Fifth Embodiment]

This fifth embodiment contemplates to stabilize the actions of the solenoid driving devices according to the first to third embodiments.

Here in the solenoid driving devices according to the first to third embodiments, the circuit shown in FIG. 12 is adopted as the current/voltage converter. Specifically, the solenoid driving device 10 according to the first embodiment shown in FIG. 4 takes the circuit construction shown in FIG. 20, where its current/voltage converter is expressed by the circuit construction shown in FIG. 12.

Figure 20:
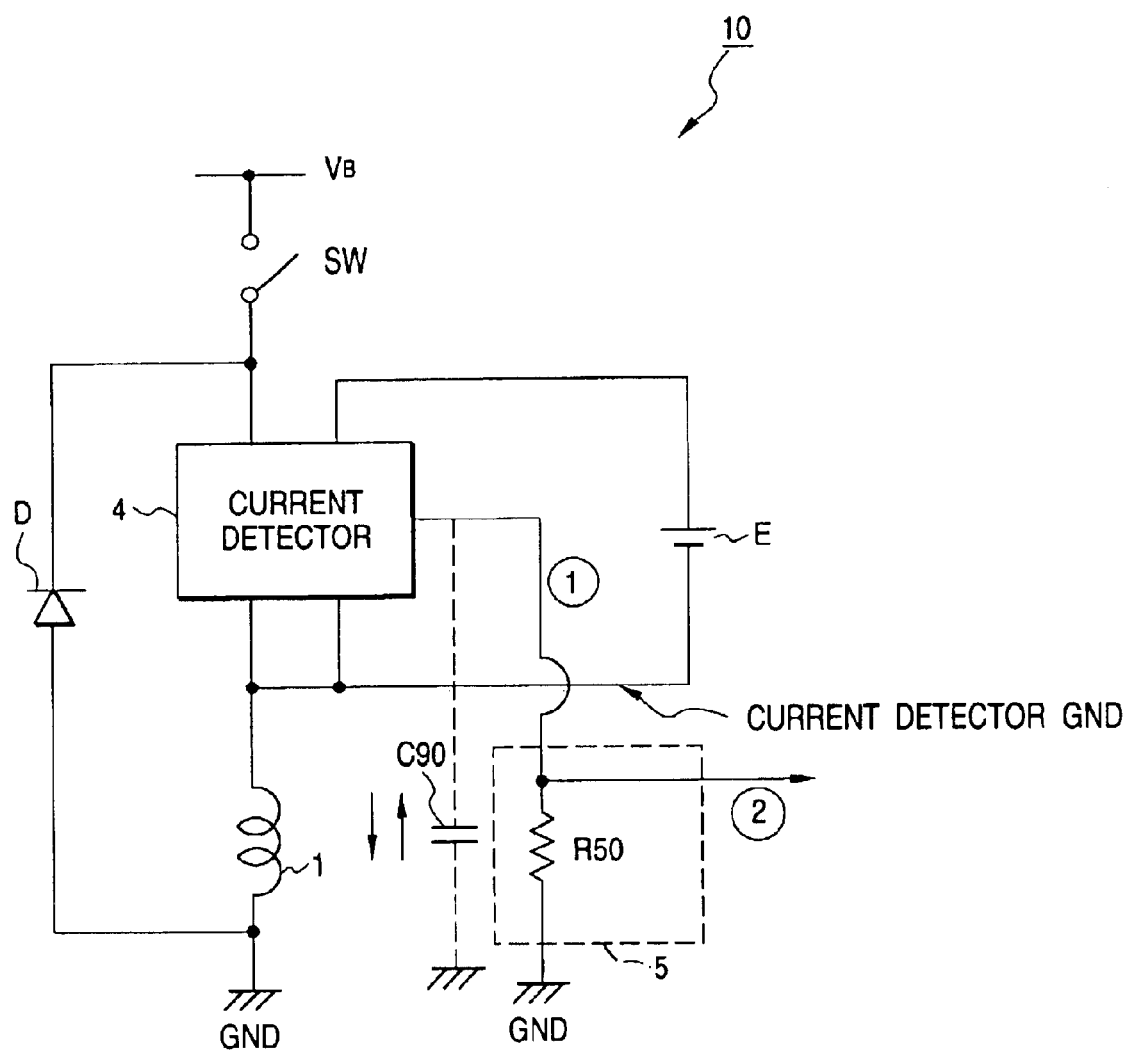
FIG. 20 is a diagram for explaining the stabilization of the actions of a current detector in a solenoid driving device according to a fifth embodiment.

As apparent from FIG. 20, the output of the current detector 4, i.e., the output signal line [1] is connected with the GND through the resistor R50 of the current/voltage converter 5. In this circuit construction, at the switching time of the switch SW, the current detector 4 is fluctuated by the electric current which flows through a coupling capacitor C90 to be established between the output signal line [1] and the GND, so that its action becomes unstable. If the output of the current detector 4 is seen from the current detector ground, more specifically, the output of the current detector 4 (or the output of the output signal line [1]) is highly fluctuated at the switching time of the switch SW.

Therefore, this fifth embodiment contemplates to stabilize the actions of the current detector 4 in the solenoid driving device 10.

Figure 21:
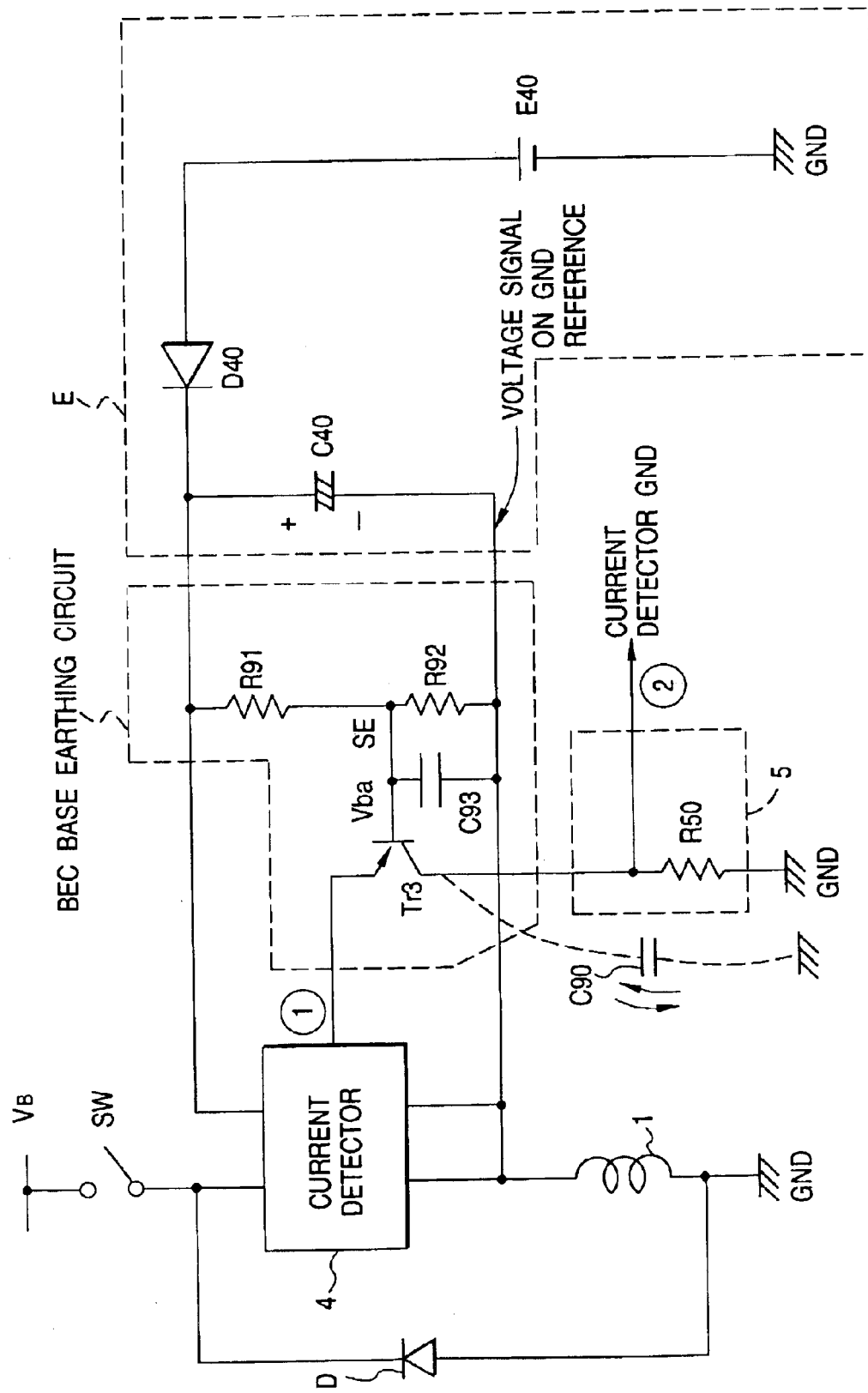
FIG. 21 is a diagram for explaining the stabilization of the actions of the current detector in the solenoid driving device according to a fifth embodiment.

In FIG. 21, there is shown a construction diagram of the solenoid driving device 10 which is intended to stabilize the actions of the current detector 4.

The solenoid driving device 10 shown in FIG. 21 is constructed by changing the detector power source E into the component shown in FIG. 11 and the current/voltage converter 5 into the component shown in FIG. 12 in the construction of the solenoid driving device 10 according to the first embodiment shown in FIG. 4, and by adding a base earthing circuit BEC to that construction.

This base earthing circuit BEC is connected between the output portion of the current detector 4, i.e., the output signal line [1] and the current/voltage converter 5.

In the base earthing circuit BEC, between the two electrodes of the electrolytic capacitor C40 composing the detector power source E, there is connected a series circuit in which a resistor R91 and a resistor R92 are connected in series. There are connected the node of the two resistors in the series circuit and the base of a transistor Tr3. To this base, there is applied the potential which is established according to the resistance ratio between the resistor R91 and the resistor R92.

Between the base of the transistor Tr3 and the ground of the current detector (or the − electrode side of the capacitor C40), on the other hand, there is connected a capacitor C93 for stabilizing the potential (or voltage) to be applied to that base. On the other hand, the transistor Tr3 is connected at its emitter with the output portion of the current detector 4, i.e., the output signal line [1] and at its collector with the resistor R50 of the current/voltage converter 5.

In this base earthing circuit BEC, the base potential (or a base Vbase) of the transistor Tr3 is stable, as viewed from the current detector ground.

On the other hand, the emitter potential (i.e., the base potential Vbase + a base-emitter voltage VBE) of the transistor Tr3, i.e., the output (i.e., the output signal line [1]) of the current detector 4 is stable, as viewed from the current detector ground.

Here, the collector of the transistor Tr3 is highly fluctuated, as viewed from the current detector ground, because the coupling capacitor C90 is established between the collector of the transistor Tr3 and the GND at the switching time of the switch SW. However, the electric current to flow through the coupling capacitor C90 is fed from the base potential Vbase so that the coupling capacitor C90 does not exert any influence upon the current detector 4.

As described above, on the other hand, the output signal line [1] is connected with the emitter of the transistor Tr3 for a stable emitter potential, as viewed from the current detector ground. Therefore, the output current from the current detector 4 is outputted to the emitter potential of the transistor Tr3 which is stable, as viewed from the current detector ground.

Therefore, the current detector 4 is not fluctuated in its output at the switching time of the switch SW but can perform a stable action.

According to the fifth embodiment thus far described, it is possible to expect effects similar to those of the first to third embodiments.

In the fifth embodiment, moreover, the current detector 4 can perform the stable action because it feeds the electric current to the stable potential (or the emitter potential of the transistor Tr3). In short, it is possible to stabilize the action of the solenoid driving device, especially, its current detector. As a result, the detected signal (or the output current signal) detected by the current detector is also stabilized.

[Sixth Embodiment]

This sixth embodiment is different, in that the current detector is connected between a solenoid and switch means and on the low side (or on the GND side) with respect to the solenoid, from the first to fifth embodiments in which the current detector is connected on the high side (or the load power source side) with respect to the solenoid.

Figure 22:
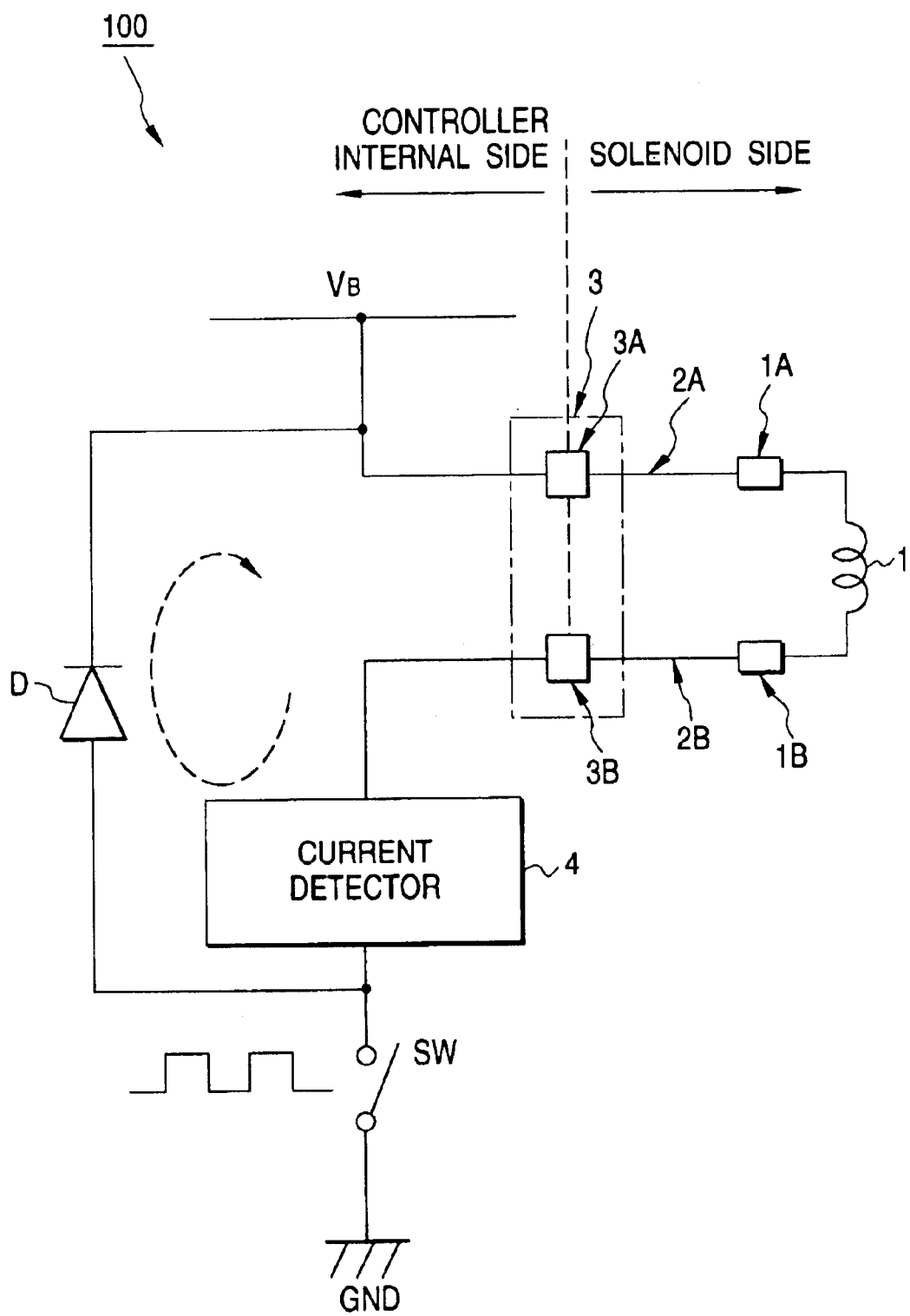
FIG. 22 is a principle diagram for explaining the principle of another solenoid driving device according to the invention.

FIG. 22 is a principle diagram for explaining the principle of a solenoid driving device 100 according to the sixth embodiment.

The solenoid driving device 100 is so modified from the construction of the solenoid driving device 10 according to the invention, as shown in FIG. 1, as to change the arrangement of the switch SW, the current detector 4 and the free-wheel diode D. Here in FIG. 22, the portions for performing the same functions as those of the components shown in FIG. 1 are designated by the common reference numerals.

In a series circuit in which the switch SW and the current detector 4 are connected in series, one end of the switch SW is connected with the GND, and one end (or an input side) of the current detector 4 is connected with the terminal portion 3B of the connector 3.

Between a first node between the load power source VB and the terminal portion 3A of the connector 3 and a second node between the current detector 4 and the switch SW, there is connected the free-wheel diode D which is connected at its cathode with the first node and at its anode with the second node.

In the solenoid driving device 100 thus constructed, the current detector 4 detects the electric current to flow through the anode side of the load power source VB, the connector 3, the signal line 2A, the solenoid 1, the signal line 2B and the connector 3, when the switch SW is turned ON by the ON/OFF actions according to the pulse-width modulation signal, and outputs the detected result to not-shown another processor.

When the switch SW is changed from the ON state to the OFF state, on the other hand, the electric current flows from the solenoid 1 to the current detector 4 and the free-wheel diode D (i.e., in the direction indicated by a dotted arrow in FIG. 22) by the inverse electromotive force generated in the solenoid 1.

Figure 29:
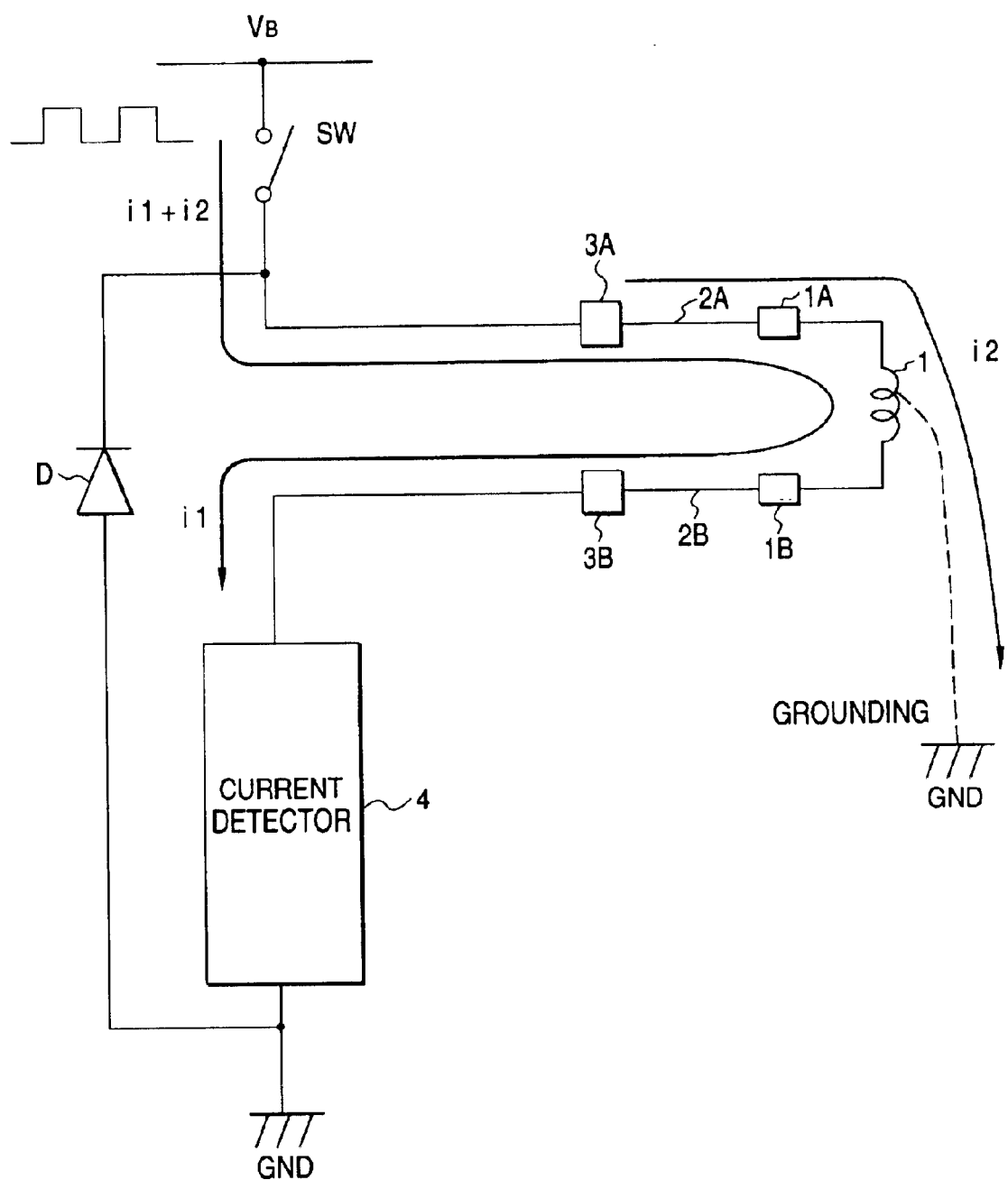
FIG. 29 is a diagram for explaining the actions of the grounding case in the solenoid driving device of the prior art.

Here in this solenoid driving device 100, the current detector 4 is disposed on the low side with respect to the solenoid 1. Where the conductive portion of the signal line for connecting the solenoid 1 outside of the controller and the controller (or its connector 3) is exposed to contact with the car body so that the solenoid 1 is incompletely or completely grounded, as in the solenoid driving device of the prior art shown in FIG. 29, the incomplete or complete grounding cannot be detected. In short, it is impossible to detect the electric current i2 which flows from the solenoid 1 to the GND (or the car body connected with the GND), as shown in FIG. 29.

Where the current detector 4 is disposed on the low side with respect to the solenoid 1, therefore, it is preferred from the standpoint of preventing the overcurrent of the solenoid 1, for example, that the overcurrent preventing circuit is disposed on the high side with respect to the solenoid 1.

Here will be explained the principle for driving a plurality of solenoids in the solenoid driving device 100 according to the invention, as shown in FIG. 22. The explanation is made on the case of two solenoids.

Figure 23:
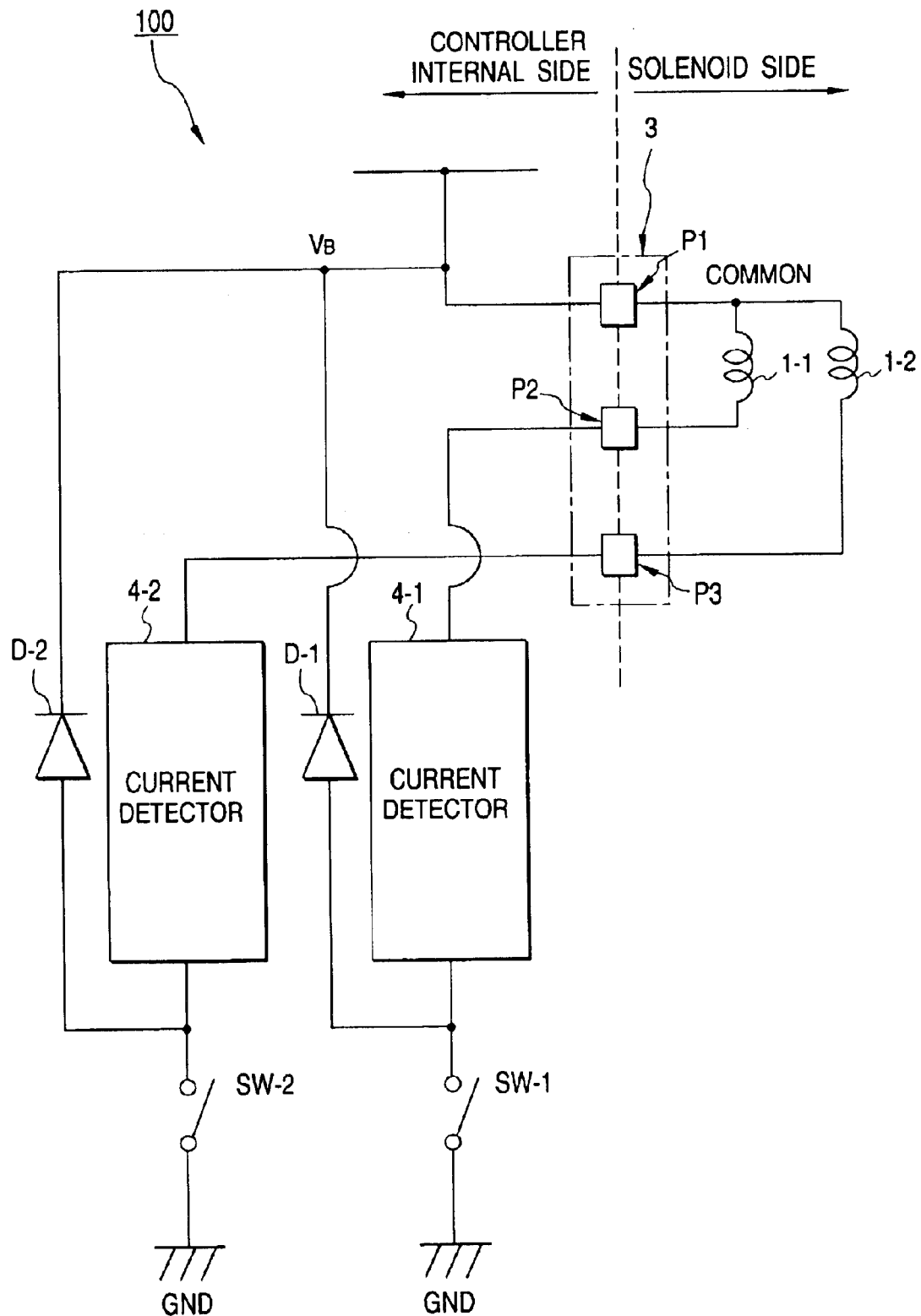
FIG. 23 is a principle diagram for explaining the principle of another solenoid driving device according to the invention.

FIG. 23 is a principle diagram showing the principle of the solenoid driving device 100 for driving the two solenoids.

In FIG. 23, switches SW-1 and SW-2, current detectors 4-1 and 4-2, solenoids 1-1 and 1-2, and free-wheel diodes D-1 and D-2 have functions similar to those of the switch SW, the current detector 4, the solenoid 1 and the free-wheel diode D, as shown in FIG. 22, respectively.

In FIG. 23, on the other hand, the terminal portion P1 of the connector 3 corresponds to the terminal portion 3A of the connector 3 shown in FIG. 22, and the terminal portions P2 and P3 of the connector 3 correspond to the terminal portion 3b of the connector 3 shown in FIG. 22. In other words, the individual one-end portions of the solenoids 1-1 and 1-2 to be connected with the load power source VB are made common.

Where the plurality of solenoids are to be driven and controlled by the (not-shown) controller in the solenoid driving device 100, therefore, the plurality of (N) solenoids can make the high sides common, and the number of signal lines for connecting the controller and the plurality of (N) solenoids may be the value which is determined by "the solenoid number (N)+1". It is, therefore, sufficient that the number (or the pin number) of the terminal portions of the connector 3 is a value determined as "the solenoid number (N)+1".

Figure 24:
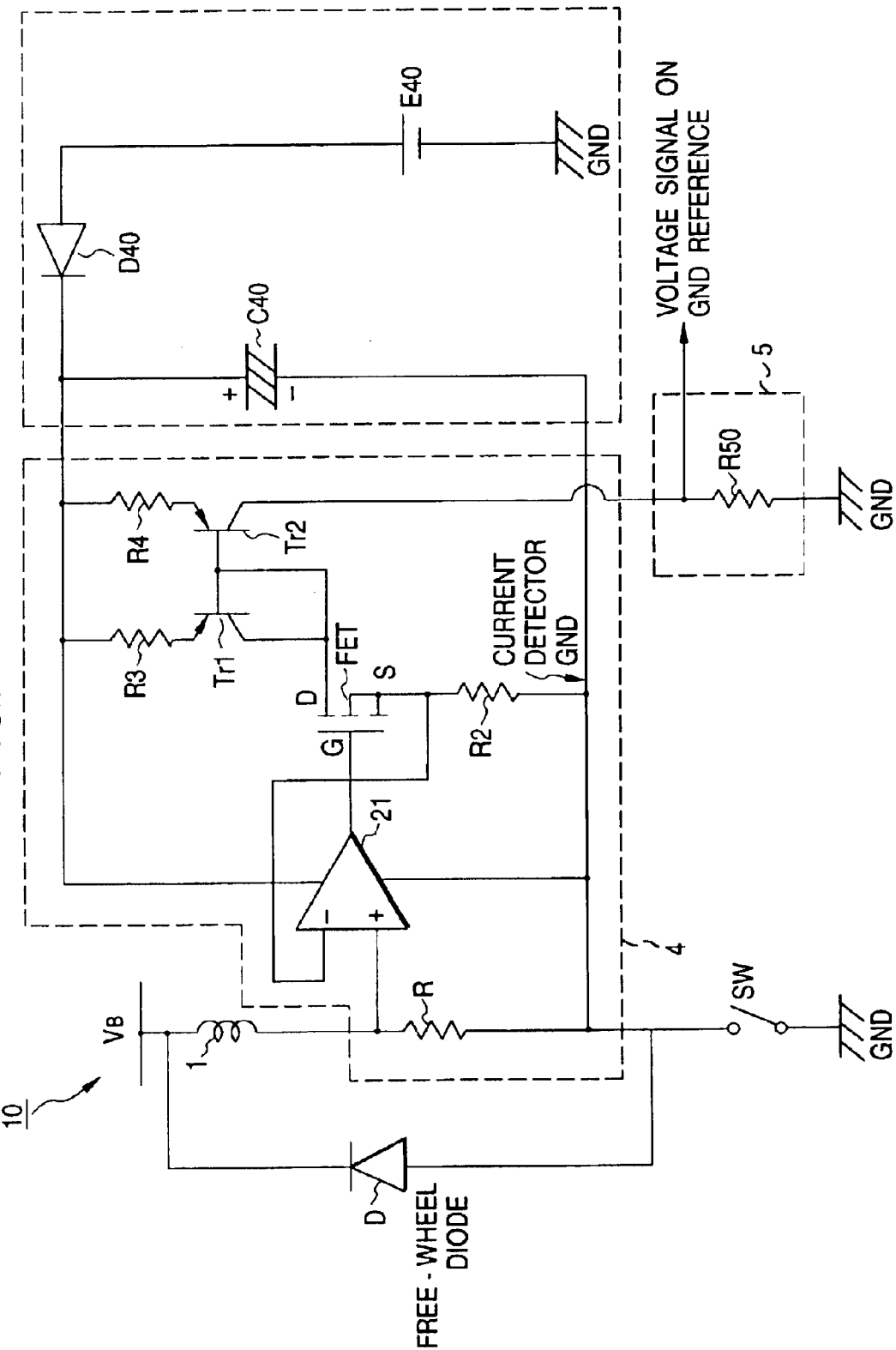
FIG. 24 is a construction diagram showing a construction of a solenoid driving device according to a sixth embodiment.
Figure 25:
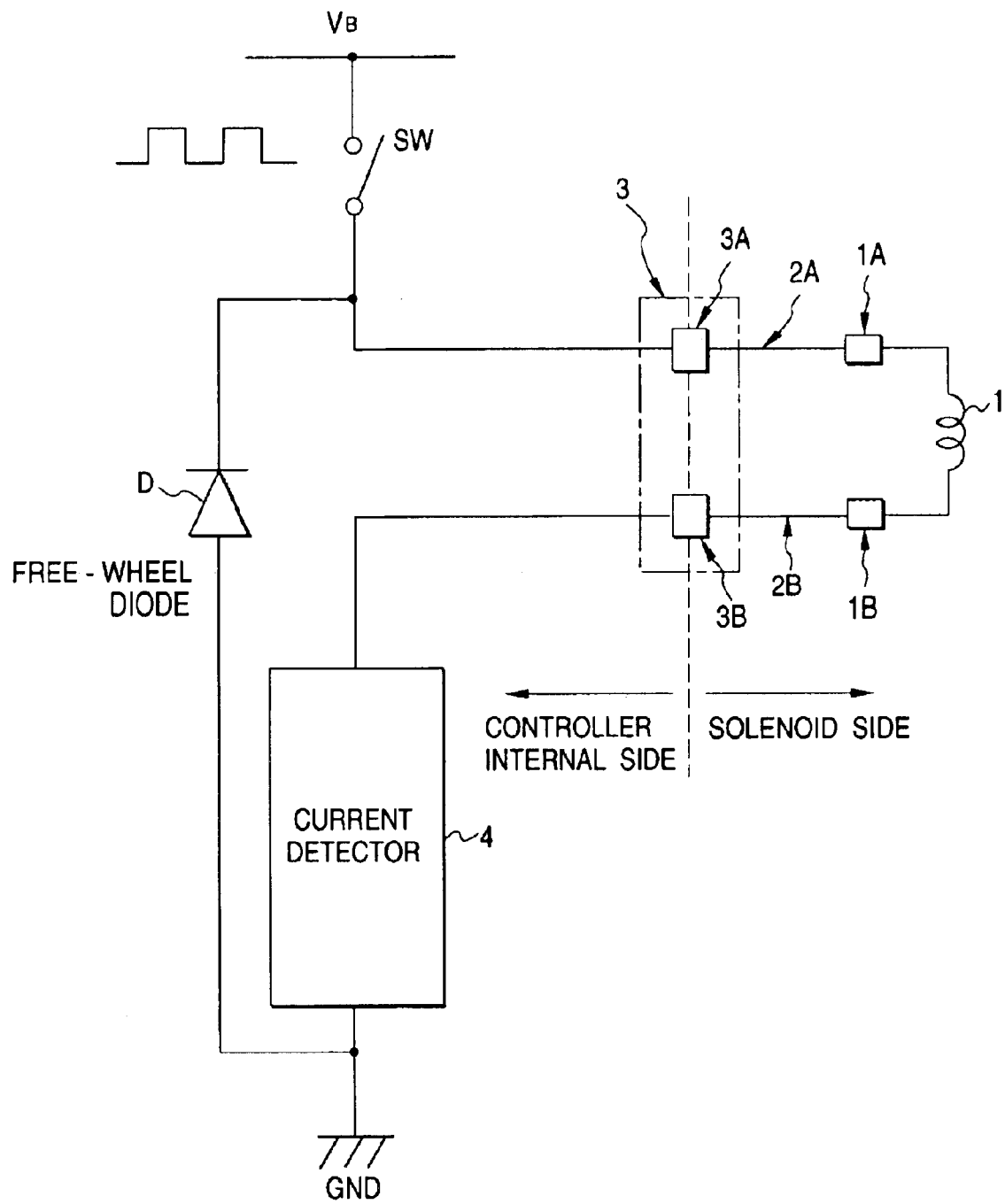
FIG. 25 is a construction diagram showing the construction of a solenoid driving device of the prior art.

FIG. 24 is an entire construction diagram showing the detailed construction of the solenoid driving device 100. This solenoid driving device 100 is different in the arrangement of the switch SW, the current detector 4 and the free-wheel diode D from the solenoid driving device 10 according to the first embodiment shown in FIG. 14, but the constructions of the components are basically common. Here in FIG. 24, the portions for performing the same functions as those of the components shown in FIG. 14 are designated by the common reference numerals. On the other hand, the detail of the entire construction diagram has been described, and its description will be omitted.

According to the sixth embodiment, as has been described hereinbefore, the current detector 4 is connected between the solenoid 1 and the switch SW and on the low side (or the GND side) with respect to the solenoid 1. It is, therefore, possible to expect the effects (1) and (2) of the first embodiment.

What is claimed is:

1. A solenoid driving device comprising:
    a solenoid for driving an electromagnetic valve;
    switch means for feeding an electric current from a first power source intermittently to said solenoid, and
    a current detector connected between said solenoid and said switch means and between said first power source and said solenoid for detecting the electric current to flow through said solenoid.

2. A solenoid driving device according to claim 1, wherein said switch means and said current detector are disposed in a controller, the outside of which is connected with said solenoid through a terminal portion, and wherein said current detector detects the electric current to flow through said solenoid connected to the outside of said controller through the terminal portion.

3. A solenoid driving device according to claim 1, wherein said electromagnetic valve is an electromagnetic proportion control valve and said current detector includes overcurrent detection.

4. A solenoid driving device according to claim 1, wherein said current detector is driven by a second power source.

5. A solenoid driving device according to claim 4, wherein said second power source includes a direct current power source.

6. A solenoid driving device comprising:
an electromagnetic valve including a solenoid;
switch means for feeding an electric current from a first power source intermittently to said solenoid, and
a current detector connected between said solenoid and said switch means for detecting the electric current to flow through said solenoid, wherein said switch means and said current detector are disposed in a controller, the at outside of which is connected with said solenoid through a terminal portion, and wherein said current detector detects the electric current to flow through said solenoid connected to the outside of said controller through the terminal portion and said current detector includes overcurrent detection.

7. A solenoid driving device, comprising:
a solenoid for driving an electromagnetic valve;
switch means for feeding an electric current from a first power source intermittently to said solenoid, and
a current detector driven by a second power source connected between said solenoid and said switch means for detecting the electric current to flow through said solenoid, said second power source including a direct current power source, said second power source including an electrical energy storage component disposed between said direct current power source and said current detector.

8. A solenoid driving device, comprising:
a solenoid for driving an electromagnetic valve;
switch means for feeding an electric current from a first power source intermittently to said solenoid, and
a current detector driven by a second power source connected between said solenoid and said switch means for detecting the electric current to flow through said solenoid, said current detector including a voltage/current converter.

9. An electromagnetic valve activation system, comprising:
a plurality N of solenoids; and
a controller including at least one current detector for detecting current to the plurality N of solenoids and the controller including a terminal portion through which the controller is electrically coupled to the plurality N of solenoids only with N+1 signal lines for driving the plurality N of solenoids.

10. The system of claim 9, wherein said controller having a first switch means and a second switch means, said first switch means for providing electricity from a first power source intermittently to a first solenoid of said plurality N of solenoids via said terminal portion, said second switch means for providing electricity from said first power source intermittently to a second solenoid of said plurality N of solenoids via said terminal portion, a first current detector disposed between said first solenoid of said plurality N of solenoids and said first switch means, and a second current detector disposed between said second solenoid of said plurality N of solenoids and said second switch means.

11. The system of claim 10, wherein said at least one current detector and said second current detector each include overcurrent detection.

12. The system of claim 10, wherein each of said first current detector and second current detector are driven by a second power source.

13. The system of claim 10, wherein said first and second current detectors each having a voltage/current converter.

* * * * *